United States Patent
Kojima et al.

(10) Patent No.: US 10,889,071 B2
(45) Date of Patent: Jan. 12, 2021

(54) DEVICE FOR MANUFACTURING FILAMENT THREE-DIMENSIONAL BONDED MEMBER AND METHOD FOR MANUFACTURING FILAMENT THREE-DIMENSIONAL BONDED MEMBER

(71) Applicant: airweave inc., Aichi (JP)

(72) Inventors: Masakazu Kojima, Aichi (JP); Masashi Fuchigami, Aichi (JP); Narutaka Makino, Aichi (JP); Akira Mizuno, Aichi (JP)

(73) Assignee: airweave inc., Aichi (JP)

( * ) Notice: Subject to any disclaimer, the term of this patent is extended or adjusted under 35 U.S.C. 154(b) by 436 days.

(21) Appl. No.: 15/578,243

(22) PCT Filed: Sep. 14, 2016

(86) PCT No.: PCT/JP2016/077157
§ 371 (c)(1),
(2) Date: Nov. 30, 2017

(87) PCT Pub. No.: WO2017/119157
PCT Pub. Date: Jul. 13, 2017

(65) Prior Publication Data
US 2018/0147792 A1 May 31, 2018

(30) Foreign Application Priority Data

Jan. 8, 2016 (JP) .................................. 2016-003004
Feb. 16, 2016 (JP) .................................. 2016-026511

(51) Int. Cl.
*B29C 70/24* (2006.01)
*D04H 3/037* (2012.01)
(Continued)

(52) U.S. Cl.
CPC .............. *B29C 70/24* (2013.01); *B33Y 40/00* (2014.12); *B33Y 70/00* (2014.12); *D04H 3/03* (2013.01);
(Continued)

(58) Field of Classification Search
CPC ......... B29C 70/24; B29C 64/118; D04H 3/03; D04H 3/16; D04H 3/037; D04H 3/14; B33Y 40/00; B33Y 70/00; B29K 2101/12
See application file for complete search history.

(56) References Cited

U.S. PATENT DOCUMENTS 2,834,202 A * 5/1958 Cook ....................... G01N 3/42 73/81
2,834,203 A * 5/1958 Sampson ................ G01N 3/42 73/81
(Continued)

FOREIGN PATENT DOCUMENTS

JP  H11-350326  12/1999
JP  2002-088631  3/2002
(Continued)

OTHER PUBLICATIONS

"International Search Report (Form PCT/ISA/210) of PCT/JP2016/077157", dated Dec. 13, 2016, with English translation thereof, pp. 1-3.

*Primary Examiner* — Jeffrey M Wollschlager
(74) *Attorney, Agent, or Firm* — JCIPRNET

(57) ABSTRACT

In a device for manufacturing a filament three-dimensional bonded member includes: a molten filament supply device which supplies a plurality of molten filaments; a three-dimensional structure formation device which receives and then cools and solidifies the molten filaments so as to form a filament three-dimensional bonded member; and a controller which controls the molten filament supply device and the three-dimensional structure formation device, a hardness
(Continued)

index measurement device is provided which measures the hardness index of the filament three-dimensional bonded member that is brought into a cooled state by the three-dimensional structure formation device, and the controller uses the information of the measurement of the hardness index measurement device that is fed back and thereby performs feedback control on at least one of the molten filament supply device and the three-dimensional structure formation device so as to reduce a variation in the hardness of the formed filament three-dimensional bonded member.

20 Claims, 17 Drawing Sheets

(51) Int. Cl.
| | | |
|---|---|---|
| *D04H 3/14* | (2012.01) | |
| *D04H 3/03* | (2012.01) | |
| *D04H 3/16* | (2006.01) | |
| *B33Y 40/00* | (2020.01) | |
| *B33Y 70/00* | (2020.01) | |
| *B29C 64/118* | (2017.01) | |
| *B29K 101/12* | (2006.01) | |

(52) U.S. Cl.
CPC ............... *D04H 3/037* (2013.01); *D04H 3/14* (2013.01); *D04H 3/16* (2013.01); *B29C 64/118* (2017.08); *B29K 2101/12* (2013.01)

(56) References Cited

U.S. PATENT DOCUMENTS

| | | | | |
|---|---|---|---|---|
| 3,541,842 A * | 11/1970 | Clark | ............ | G01N 3/40 73/81 |
| 3,687,759 A * | 8/1972 | Werner | ............ | D04H 3/16 156/167 |
| 3,691,004 A * | 9/1972 | Werner | ............ | D04H 3/16 428/219 |
| 3,822,588 A * | 7/1974 | Knight | ............ | G01N 3/40 73/81 |
| 4,351,683 A * | 9/1982 | Kusilek | ............ | B32B 27/00 156/167 |
| 5,292,463 A * | 3/1994 | Paul | ............ | B29C 48/875 264/40.6 |
| 5,298,315 A * | 3/1994 | Fukui | ............ | B32B 5/08 442/387 |
| 5,464,491 A * | 11/1995 | Yamanaka | ............ | D04H 3/02 156/167 |
| 5,487,655 A * | 1/1996 | Frey | ............ | D01D 5/0985 425/140 |
| 5,728,407 A * | 3/1998 | Matsui | ............ | D01D 4/025 425/7 |
| 6,378,150 B1 * | 4/2002 | Minegishi | ............ | D04H 3/037 5/652 |
| 9,615,670 B2 * | 4/2017 | Takaoka | ............ | B32B 5/18 |
| 2003/0092335 A1 * | 5/2003 | Takaoka | ............ | D04H 13/002 442/1 |
| 2003/0164228 A1 * | 9/2003 | Munch | ............ | D21F 1/32 162/199 |
| 2006/0116045 A1 * | 6/2006 | Nishibori | ............ | B29C 48/05 442/338 |
| 2007/0216053 A1 * | 9/2007 | Breyer | ............ | B29C 48/08 264/40.1 |
| 2009/0263529 A1 * | 10/2009 | Nozawa | ............ | B29C 48/2556 425/131.1 |
| 2012/0042452 A1 * | 2/2012 | Takaoka | ............ | A47C 31/006 5/691 |
| 2013/0161858 A1 * | 6/2013 | Sasaki | ............ | D04H 3/037 264/167 |
| 2014/0035191 A1 * | 2/2014 | Takaoka | ............ | B29C 48/001 264/210.8 |
| 2016/0122925 A1 * | 5/2016 | Shah | ............ | D04H 3/03 442/50 |
| 2017/0043509 A1 * | 2/2017 | Kitamoto | ............ | B01D 69/105 |

FOREIGN PATENT DOCUMENTS

| | | |
|---|---|---|
| JP | 2016-000528 | 1/2016 |
| WO | 2012035736 | 3/2012 |

* cited by examiner

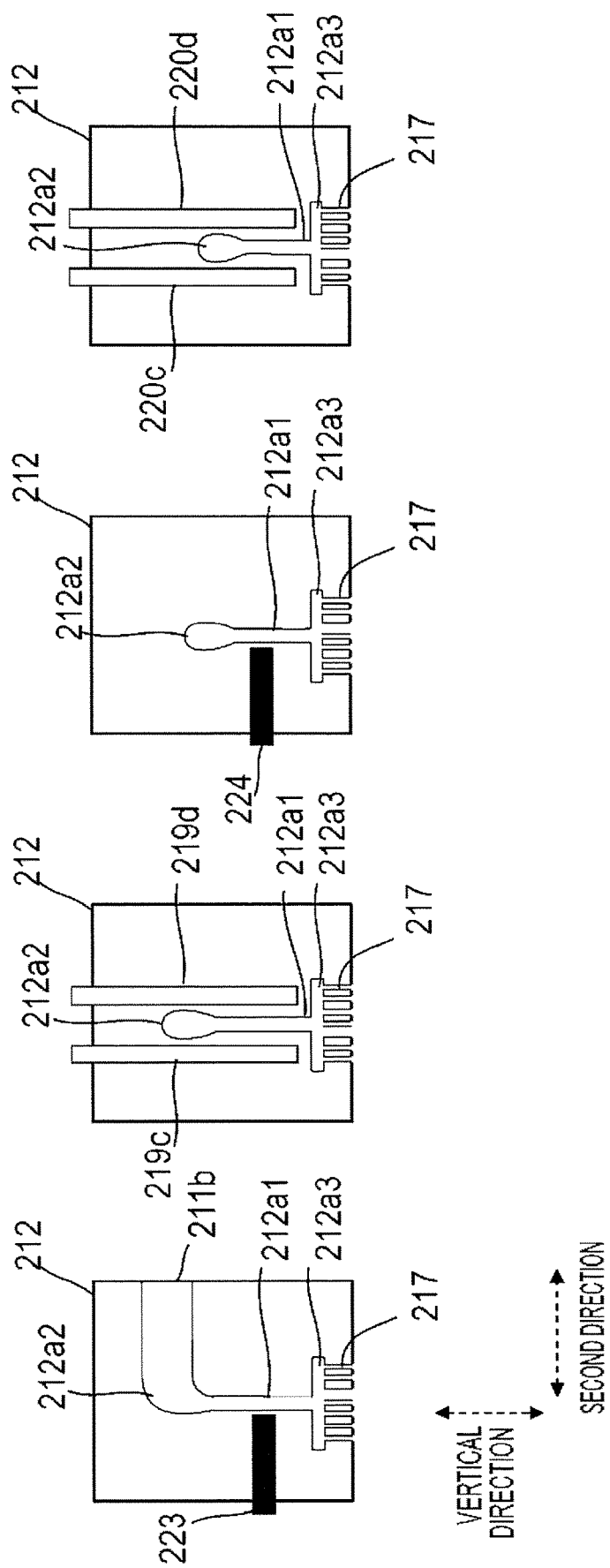

DEVICE FOR MANUFACTURING FILAMENT THREE-DIMENSIONAL BONDED MEMBER AND METHOD FOR MANUFACTURING FILAMENT THREE-DIMENSIONAL BONDED MEMBER

CROSS-REFERENCE TO RELATED APPLICATION

This application is a 371 application of International PCT application serial no. PCT/JP2016/077157, filed on Sep. 14, 2016, which claims the priority benefit of Japan application no. 2016-026511, filed on Feb. 16, 2016, and the priority benefit of Japan application no. 2016-003004, filed on Jan. 8, 2016. The entirety of each of the above-mentioned patent applications is hereby incorporated by reference herein and made a part of this specification.

TECHNICAL FIELD

The present invention relates to a device for manufacturing a filament three-dimensional bonded member and a method for manufacturing such a filament three-dimensional bonded member.

BACKGROUND ART

In recent years, as a cushion material used for a mattress, a pillow or the like, attention has been focused on a filament three-dimensional bonded member which is obtained by partially fusing a plurality of thermoplastic resin fibers (filaments) in a molten state.

For example, in patent document 1, thermoplastic resin fibers which are extruded from a plurality of nozzles and which are in a molten state are fused to each other so as to form three-dimensional bonding, and are thereafter cooled and solidified, and thus a solid network three-dimensional bonded member is formed.

RELATED ART DOCUMENT

Patent Document

Patent Document 1: Japanese Unexamined Patent Application Publication No. 2002-088631

DISCLOSURE OF THE INVENTION

Problems to be Solved by the Invention

However, in the manufacturing method disclosed in patent document 1, variations in the hardness of the solid network three-dimensional bonded member formed are produced depending on the manufacturing lot, and even in the same manufacturing lot, variations in the hardness are produced depending on the situation, with the result that it is difficult to obtain a three-dimensional bonded member whose hardness is uniform.

This is considered to be because a plurality of factors act. Examples of the factors include: the temperature of a thermoplastic resin within a molten filament feed device is affected and changed by an ambient temperature or the like such that the fusing strength of filaments is changed; and the viscosity at the time of melting is changed by a slight difference in the resin material or the like, and thus the amount of thermoplastic resin fiber which is extruded from a plurality of nozzles and which is fed out per unit time is changed, with the result that the density of the obtained filament three-dimensional bonded member per unit volume is changed.

In view of the forgoing conditions, the present invention has an object to provide a manufacturing technology which can reduce variations in the hardness of the filament three-dimensional bonded member by reducing the influences of the factors described above.

Means for Solving the Problem

A device for manufacturing a filament three-dimensional bonded member according to the present invention includes: a molten filament supply device which supplies a plurality of molten filaments; a three-dimensional structure formation device which receives and then cools and solidifies the molten filaments so as to form a filament three-dimensional bonded member; and a controller which controls the molten filament supply device and the three-dimensional structure formation device, where a hardness index measurement device is provided which measures the hardness index of the filament three-dimensional bonded member that is brought into a cooled state by the three-dimensional structure formation device, and the controller uses the information of the measurement of the hardness index measurement device that is fed back and thereby performs feedback control on at least one of the molten filament supply device and the three-dimensional structure formation device so as to reduce a variation in hardness of the formed filament three-dimensional bonded member.

In this configuration, a variation in the hardness of the filament three-dimensional bonded member formed within the three-dimensional structure formation device is fed back early, and thus it is possible to adjust the hardness of the following filament three-dimensional bonded member, with the result that the hardness can be stabilized. Preferably, the hardness index measurement device is installed in such a position that it is possible to measure the hardness of the filament three-dimensional bonded member immediately after being formed by being cooled and solidified within the three-dimensional structure formation device.

In the configuration described above, the cooled state may be a state where the molten filaments are cooled and solidified so as not to be irreversibly deformed. In the configuration described above, within the three-dimensional structure formation device, a transport member may be provided which transports the formed filament three-dimensional bonded member, and the feedback control may be performed for controlling a transport speed of the transport member.

In this configuration, as the transport speed of the transport member is increased, the filament density of the filament three-dimensional bonded member per unit volume is lowered, and thus the hardness index is lowered (the filament three-dimensional bonded member is softened) whereas when the transport speed is decreased, the filament density per unit volume is increased, and thus the filament three-dimensional bonded member is hardened, with the result that by the utilization of the hardening, it is possible to reduce a variation in the hardness index of the filament three-dimensional bonded member. In other words, when the filament three-dimensional bonded member is manufactured, the filament three-dimensional bonded member whose hardness is little varied can be obtained.

In the configuration described above, the molten filament supply device may heat and melt a resin and pressurize the molten resin so as to supply the molten filaments, and the feedback control may be performed for controlling at least one of the degree of the heating and the degree of the pressurization.

In this configuration, it is possible to avoid a variation in the hardness of the filament three-dimensional bonded member caused by a variation in the amount of molten filament fed out per unit time. In other words, since the amount of molten filament supplied is changed depending on the temperature, the viscosity, the material and the like thereof, based on the results of the measurement of the hardness index measurement device, the amount of molten filament supplied by the supply amount control device is controlled to be a predetermined amount, and this makes it possible that the hardness is unlikely to be changed.

For example, when the temperature of the molten filament within the molten filament supply device is changed, and thus the amount of molten filament fed out per unit time is changed, it is possible to perform control in which heating by the heating portion is adjusted so as to keep constant the temperature of the molten filament or to perform control in which pressurization by the pressurization portion is changed so as to keep constant the amount of molten filament supplied. In particular, when the heating portion is controlled, it is possible to effectively prevent the supplied amount from being changed resulting from the material or another factor other than the temperature.

The transport member may include endless conveyors which are provided in a molten filament reception portion, and the hardness index measurement device may be provided in a transport path on the downstream side with respect to the endless belt. In this way, immediately after the filament three-dimensional bonded member is formed while the molten filament is being cooled and solidified, the hardness index thereof can be measured and fed back, and thus a variation in the hardness index is corrected early such that a variation in the hardness is reduced, with the result that the quality thereof can be enhanced.

In the configuration described above, the hardness index measurement device may include: a pressure application means which applies a predetermined pressure between the front and the back of the filament three-dimensional bonded member; and a displacement sensor which detects the degree of recessing of the filament three-dimensional bonded member caused by the application of the pressure and which outputs the degree. In this configuration, since the hardness index measurement device can be designed so as to be compact, for example, even when a plurality of hardness index measurement devices are installed, it is possible to reduce an increase in the size of the device. Hence, it is possible to contribute to a reduction in the size of the device.

In the configuration described above, the hardness index measurement device may include: an abutting member which is rotated in the direction of movement of the filament three-dimensional bonded member such that a pressurization surface abuts on the filament three-dimensional bonded member; and a pressure sensor which detects a repulsive pressure received by the abutting member from the filament three-dimensional bonded member and which outputs the repulsive pressure.

The following configuration may be adopted. The hardness index measurement device includes a pair of abutting members which are opposite each other and in which at least one of them can be rotated and a pressure sensor which measures a pressure received by the abutting member, the shortest distance between the pair of abutting members in the opposite direction is changed by the rotation of at least one of the abutting members and the pressure sensor measures the pressure in the opposite direction when at least one of the abutting members is rotated in a state where the pair of abutting members abut on each other through the filament three-dimensional bonded member.

In the configuration described above, since the abutting member which abuts on the filament three-dimensional bonded member is rotated, when the hardness index of the filament three-dimensional bonded member which is transported is measured, it is possible to prevent the occurrence of a deflection and a wrinkle in the filament three-dimensional bonded member.

A method for manufacturing a filament three-dimensional bonded member according to the present invention uses a device for manufacturing a filament three-dimensional bonded member that includes: a molten filament supply device which supplies a plurality of molten filaments; and a three-dimensional structure formation device which receives and then fuses the molten filaments so as to form a filament three-dimensional bonded member, where the hardness index of the formed filament three-dimensional bonded member is measured, and at least one of the molten filament supply device and the three-dimensional structure formation device is controlled according to the result of the measurement such that a variation in the hardness of the filament three-dimensional bonded member is reduced.

In this method, even when the hardness of the filament three-dimensional bonded member is varied due to various factors, it is possible to immediately return it to the intended hardness, and thus it is possible to stabilize the hardness. In the method described above, within the three-dimensional structure formation device, a transport member may be provided which transports the formed filament three-dimensional bonded member, and the control may be performed for controlling the transport speed of the transport member. In this method, it is possible to effectively reduce a variation in the filament density of the filament three-dimensional bonded member and a variation in the hardness index thereof.

In the configuration described above, the molten filament supply device may include: a cap portion in which a plurality of nozzles are formed and in which as compared with the length of the cap portion in the first direction, the length thereof in the second direction perpendicular to the first direction is short; a plurality of heaters; and a guide flow path which guides a molten thermoplastic resin to the cap portion, the molten filament supply device may be formed so as to discharge, through the nozzles, the molten thermoplastic resin guided to the cap portion and thereby supply the molten filaments, the guide flow path may include a flat guide flow portion in which as compared with the length of the flat guide flow portion in the first direction, the length thereof in the second direction is narrowed, the heaters may be arranged in different positions along the flat guide flow portion in the first direction and the control may be performed for controlling outputs of the heaters.

In this configuration, for example, even when the filament three-dimensional bonded member that is used such as for a mattress whose width is wide is manufactured, it is easy to control the temperature of the molten thermoplastic resin in the direction of the width (the first direction) and thereby more appropriately control the hardness of the filament three-dimensional bonded member. As an example, it is easy to reduce a variation in the hardness of the filament three-dimensional bonded member in the direction of the width and to adjust a difference in the hardness in the direction of the width to the intended state.

In the configuration described above, a ratio between the length of the flat guide flow portion in the first direction and the length thereof in the second direction may be higher than the ratio in the cap portion. In the configuration described above, a plurality of temperature sensors may be arranged so as to be aligned along the flat guide flow portion in the first direction. In this configuration, since a plurality of temperature sensors are arranged so as to be aligned along the flat guide flow portion in the first direction, by the utilization of the results of the detection, it is possible to control the outputs of the heaters.

In the configuration described above, a plurality of hardness index measurement devices described above which are arranged in different positions in the first direction may be provided, each of the hardness index measurement devices may measure the hardness index of the filament three-dimensional bonded member in the corresponding position and the controller may control, as the feedback control, the outputs of the heaters based on the results of the measurements of the hardness index measurement devices.

In this configuration, with the hardness indexes measured with a plurality of hardness index measurement portions arranged in the direction of the width (the first direction), the hardness indexes of the individual portions of the filament three-dimensional bonded member are measured, and based on the information thereof, the outputs (temperatures) of the heaters in the corresponding positions can be controlled. Hence, it is possible to more reliably reduce a variation in the hardness of the filament three-dimensional bonded member in the direction of the width (the first direction).

A method for manufacturing a filament three-dimensional bonded member according to the present invention includes: a molten thermoplastic resin supply step of supplying, through a guide flow path including a flat guide flow portion in which as compared with the length of the flat guide flow portion in a first direction, the length thereof in a second direction perpendicular to the first direction is narrowed, a molten thermoplastic resin to a cap portion in which as compared with the length of the cap portion in the first direction, the length thereof in the second direction is short; a molten filament supply step of passing the molten thermoplastic resin through a plurality of nozzles formed in the cap portion so as to discharge a plurality of molten filaments; a filament three-dimensional bonded member generation step of fusing and then cooling and solidifying the molten filaments so as to form a filament three-dimensional bonded member; a hardness index measurement step of measuring hardness indexes in a plurality of positions in the direction of the width of the filament three-dimensional bonded member corresponding to the first direction; and a temperature control step of controlling, by use of information of the results of the measurements that is fed back, the temperatures of heaters which are arranged so as to be aligned along the flat guide flow portion in the first direction such that a variation in the hardness of the formed filament three-dimensional bonded member is reduced.

Advantages of the Invention

According to the present invention, it is possible to provide a manufacturing technology which can reduce variations in the hardness of a filament three-dimensional bonded member.

BRIEF DESCRIPTION OF DRAWINGS

FIG. 15A A cross-sectional view taken along line A-A' indicated by arrows in the filament discharge portion (die) shown in FIG. 14A;

FIG. 15B A cross-sectional view taken along line B-B' indicated by arrows in the filament discharge portion (die) shown in FIG. 14A;

FIG. 15C A cross-sectional view taken along line C-C' indicated by arrows in the filament discharge portion (die) shown in FIG. 14A;

FIG. 15D A cross-sectional view taken along line D-D' indicated by arrows in the filament discharge portion (die) shown in FIG. 14A;

DESCRIPTION OF EMBODIMENTS

The present invention will be described below with reference to drawings using first to fifth embodiments as examples of the embodiment of a device for manufacturing a filament three-dimensional bonded member according to the present invention.

First Embodiment

Figure 1:
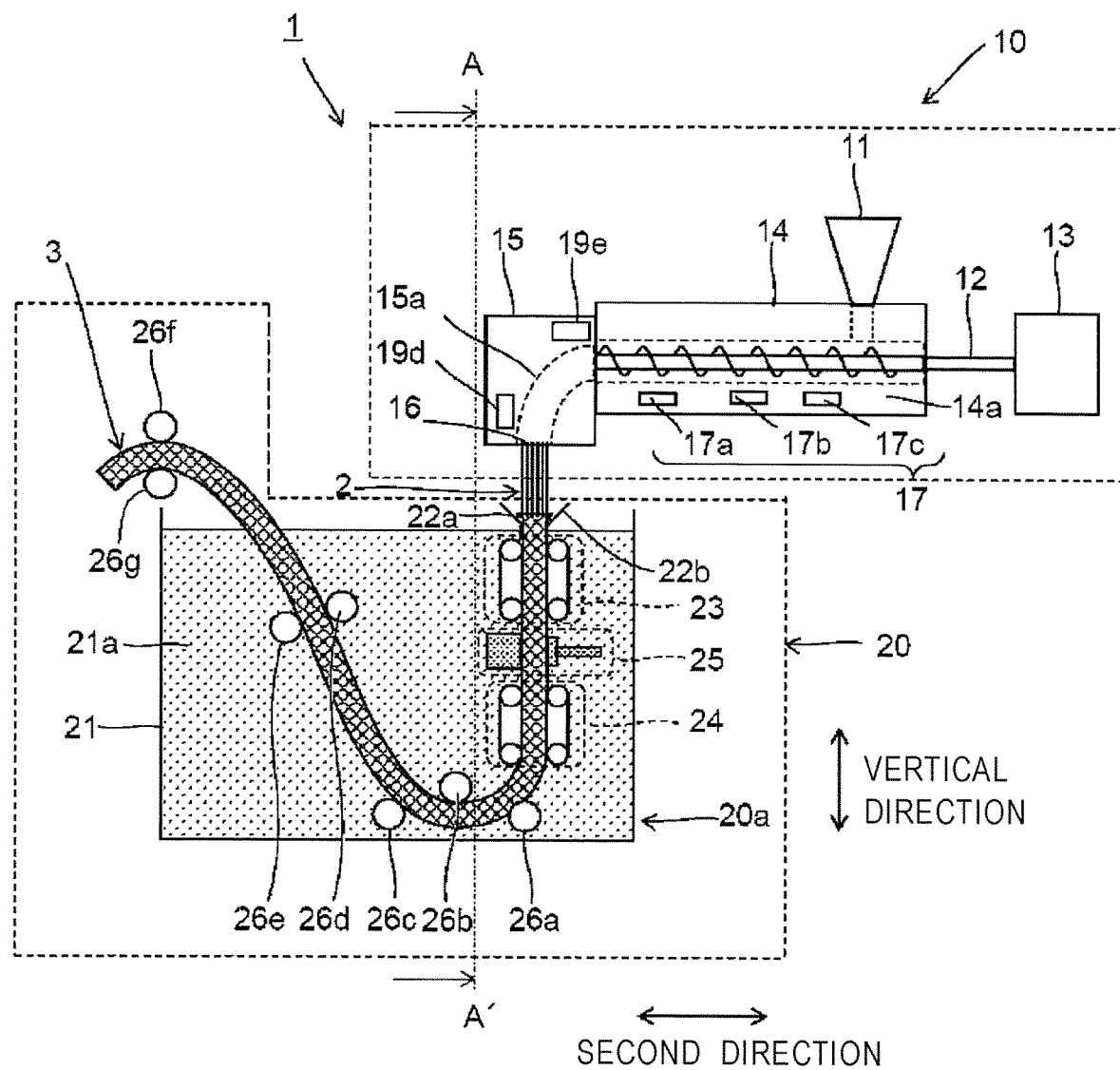
FIG. 1 A configuration diagram showing an example of a device for manufacturing a filament three-dimensional bonded member.
Figure 2:
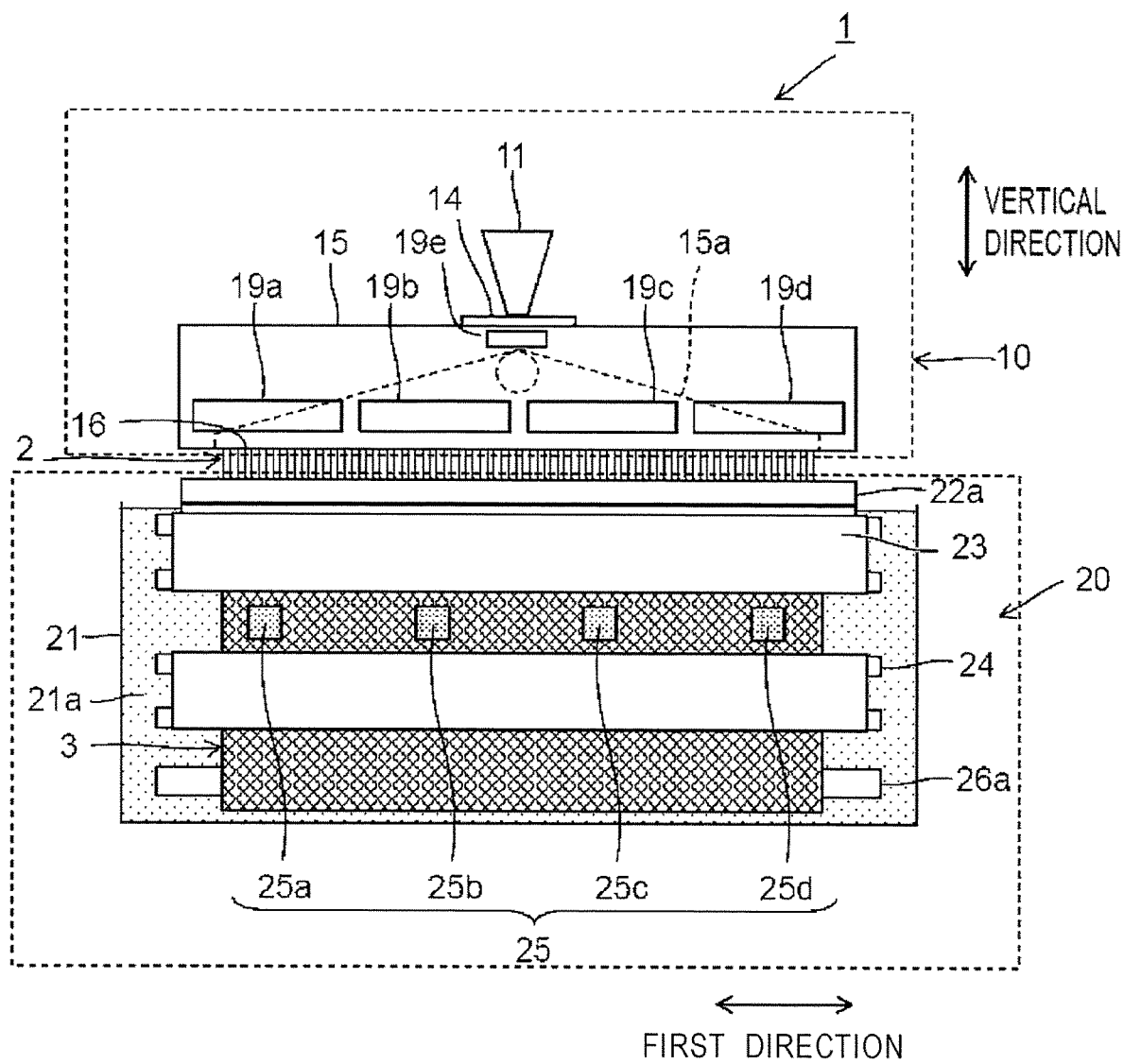
FIG. 2 A cross-sectional view taken along line A-A' indicated by arrows in a hardness index measurement device in the device for manufacturing the filament three-dimensional bonded member shown in FIG. 1.
Figure 3:
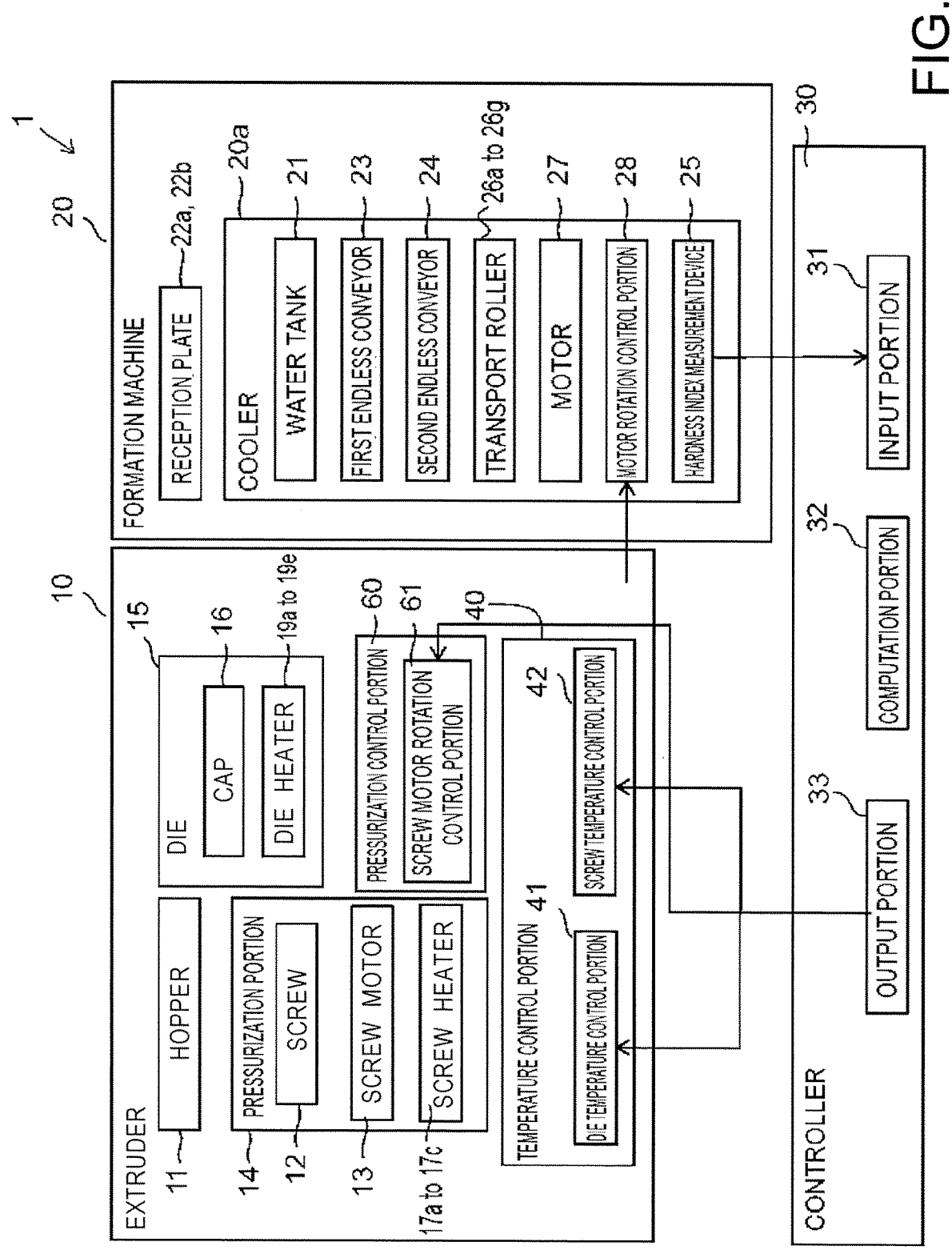
FIG. 3 A block diagram of the device for manufacturing the filament three-dimensional bonded member shown in FIG. 1.

FIG. 1 is configuration diagram showing an example of a device for manufacturing a filament three-dimensional bonded member 1. FIG. 2 is a cross-sectional view taken along line A-A' indicated by arrows in the device for manufacturing the filament three-dimensional bonded member 1 shown in FIG. 1. FIG. 3 is a block diagram of the device for manufacturing the filament three-dimensional bonded member 1 shown in FIG. 1. A vertical direction, a first direction and a second direction in the following description are as shown in FIGS. 1 and 2. In the individual embodiments, the first direction and the second direction are directions (horizontal directions) which are perpendicular to the vertical direction. The first direction and the second direction are perpendicular to each other.

In FIG. 1, the device for manufacturing the filament three-dimensional bonded member 1 is a device for manufacturing a filament three-dimensional bonded member 3 which has a solid network structure and which is formed with thermoplastic resin fibers, and is basically formed with an extruder 10, a formation machine 20 and a controller 30 shown in FIG. 3 (which is not shown in FIGS. 1 and 2). In the following description, the thermoplastic resin fiber is referred to as a filament, and the filament three-dimensional bonded member 3 is referred to as a 3DF (3-Dimensional Filaments-linked structure). The device for manufacturing the filament three-dimensional bonded member 1 is referred to as a 3DF manufacturing device 1.

The extruder 10 is an example of a molten filament supply device, and forms a filament in a molten state and supplies it to the formation machine 20. The extruder 10 includes a pressurization portion 14 which has a hopper 11 for material input and a die 15 which has a cap 16, and feeds out the filament 2 (which is also hereinafter referred to as the molten filament 2) from the cap 16. The die 15 is provided so as to communicate with the pressurization portion 14.

The hopper 11 is a material input portion for inputting a thermoplastic resin serving as the material of the filament into the extruder 10. Examples of the thermoplastic resin which can be used as the material of the 3DF 3 include: polyolefin-based resins such as polyethylene and polypropylene; polyester-based resins such as polyethylene terephthalate; polyamide-based resin such as nylon 66; a polyvinyl chloride resin; and a polystyrene resin. A copolymer which is obtained by copolymerization based on these resins or an elastomer may be used or these resins may be used by being blended. As the thermoplastic resin, a thermoplastic elastomer can also be used such as a styrene-based elastomer, a vinyl chloride-based elastomer, an olefin-based elastomer, a urethane-based elastomer, a polyester-based elastomer, a nitrile-based elastomer, a polyamide-based elastomer or a fluorine-based elastomer.

In the pressurization portion 14, a cylinder 14a is formed therewithin, and a screw 12 which is rotated by a screw motor 13 is inserted through the cylinder 14a. On the outer circumference of the cylinder 14a, screw heaters 17a to 17c (screw heaters 17) are fitted. The screw 12 is a pressurization transport member which transports, to the die 15, the thermoplastic resin that is melted by being heated with the screw heaters 17a to 17c while pressurizing the thermoplastic resin. The screw heaters 17a to 17c are a heating portion which heats the thermoplastic resin within the cylinder 14a.

The die 15 is a filament feed portion which forms the thermoplastic resin in the molten state transported from the pressurization portion 14 into the fibrous molten filament 2 and which feeds out the molten filament 2, and within the die 15, an arc-shaped die guide flow path 15a shown in FIG. 1 is formed. As shown in FIG. 2, the die guide flow path 15a is shaped so as to expand toward the cap 16. Die heaters 19a to 19e are a heating portion which heats the molten filament that is passed thorough the die guide flow path 15a. The cap 16 is a nozzle portion which has a plurality of nozzles (unillustrated) for feeding out the molten filament 2, and forms a plurality of fibrous molten filaments 2.

As shown in FIG. 3, the extruder 10 includes a temperature control portion 40 and a pressurization control portion 60. The temperature control portion 40 has a die temperature control portion 41 and a screw temperature control portion 42 as a circuit portion. The die temperature control portion 41 controls, based on a control signal output from the controller 30, the temperatures of the die heaters 19a to 19e. The screw temperature control portion 42 controls, based on a control signal output from the controller 30, the temperatures of the screw heaters 17a to 17c.

In the vicinity of the die heaters 19a to 19e and the screw heaters 17a to 17c, unillustrated temperature sensors for measuring the temperature of the molten filament are individually provided. The die temperature control portion 41 and the screw temperature control portion 42 control the outputs of the die heaters 19a to 19e and the screw heaters 17a to 17c while monitoring the temperatures measured by the temperature sensors.

The pressurization control portion 60 includes a screw motor rotation control portion 61 which controls the number of revolutions of the screw motor 13 based on a control signal output from the controller 30.

The extruder 10 uses the screw 12, the screw heaters 17a to 17c, the die heaters 19a to 19e and the like which are operated based on the control signals from the controller 30 so as to heat and melt, within the cylinder 14a, the thermoplastic resin supplied from the hopper 11, and guides out the thermoplastic resin as the molten filaments 2 through the die guide flow path 15a within the die 15 from the nozzles formed in the cap 16.

The formation machine 20 is an example of a three-dimensional structure formation device, and fuses and then cools and solidifies the molten filaments 2 so as to form the 3DF 3 of the solid network structure. The formation machine 20 includes: a pair of reception plates 22a and 22b which receive, below the die 15, the molten filaments 2 fed out from the die 15 and which facilitates the retention thereof; and a cooler 20a which includes a water tank 21 where cooling water 21a is stored.

The pair of reception plates 22a and 22b are an example of a filament bonding portion, and are arranged, as shown in FIG. 2, opposite each other such that a plane where the second direction is the normal is a symmetry plane. The upper portions of the pair of reception plates 22a and 22b are formed in the shape of an inverted letter "V" when seen in the first direction such that the molten filaments 2 supplied from above are guided therebetween. The pair of reception plates 22a and 22b temporarily retain the molten filaments 2 therebetween, and facilitate the fusing of the molten filaments 2 by the utilization of the buoyancy action of the cooling water 21a within the water tank 21. In the upper portions of the reception plates 22a and 22b, cooling water supply water absorption devices (unillustrated) for supplying the cooling water to the entire surfaces of the reception plates 22a and 22b may be provided. The cooling water is supplied, and thus the temperatures of the reception plates 22a and 22b are prevented from being increased, with the result that it is possible to prevent the molten filaments 2 from being fused to the reception plates 22a and 22b.

The cooler 20a is an example of a filament cooling portion, and cools and solidifies the fused molten filaments 2. The cooler 20a includes the water tank 21 where the cooling water 21a is stored, a pair of first endless conveyors 23, a pair of second endless conveyors 24, a hardness index measurement device 25, a plurality of transport rollers 26a to 26g, a motor 27 and a motor rotation control portion 28.

The first endless conveyors 23, the second endless conveyors 24 and the transport rollers 26a to 26g are part of a transport member which transports the 3DF 3. The pair of first endless conveyors 23 are provided parallel to each other with a predetermined distance provided in the second direction (which is the same direction as the direction of the thickness of the 3DF 3).

The first endless conveyors 23 are provided below the pair of reception plates 22a and 22b in the vertical direction, and move downward the network molten filaments 2 which are in the process of being three-dimensionally fused while cooling the molten filaments 2 with the cooling water 21a. The transport speed of the endless conveyors 23 is closely related to the filament density. In other words, in a relationship with the cooling speed of the molten filament 2, as the transport speed is increased, the filament density is lowered whereas as the transport speed is decreased, the filament density is increased.

In the subsequent stage of the first endless conveyors 23 (on the downstream side of the transport, that is, in this embodiment, in a lower portion in the vertical direction), the pair of second endless conveyors 24 are provided parallel to each other with a predetermined distance provided in the second direction. The second endless conveyors 24 significantly facilitate, below the first endless conveyors 23, the transport of the 3DF 3 which is almost cooled and solidified. The transport rollers 26a to 26g are provided in the subsequent stage of the second endless conveyors 24, and transport, to the outside of the water tank 21, the 3DF 3 which is passed through the second endless conveyors 24. The 3DF 3 which is located within the cooling water 21a is in a cooled state by the action of the formation machine 20 (three-dimensional structure formation device).

The hardness index measurement device 25 measures the hardness index of the 3DF 3. In the present invention, as long as the hardness index is a parameter which indicates the hardness of the 3DF 3 in the direction of the thickness thereof, for example, a repulsive force when the 3DF 3 is deformed only a predetermined distance in the direction of the thickness or the amount of deformation when a predetermined pressure is applied to the 3DF 3 in the direction of the thickness can be used. Although in the present embodiment, as the timing at which the hardness index is measured, a method of intermittently performing the measurement is described, a method of continuously measuring the repulsive force or the amount of deformation such as by a method of constantly deforming the 3DF 3 only a predetermined distance in the direction of the thickness or a method of constantly applying a predetermined pressure to the 3DF 3 in the direction of the thickness may be adopted.

In the present embodiment, a plurality of hardness index measurement devices 25 are provided between the first endless conveyors 23 and the second endless conveyors 24 so as to be aligned with the first direction (which is the same direction as the direction of the width of the 3DF 3) (see FIG. 2). Specifically, at four places in the direction of the width of the 3DF 3, hardness index measurement devices 25a to 25d are provided horizontally. The hardness index measurement devices 25a to 25d individually measure the hardness index of the 3DF 3 transported from the first endless conveyors 23. The hardness index measurement devices 25 are provided below the first endless conveyors 23 as described above, and this position corresponds to a position in which the molten filaments 2 are cooled such that the 3DF 3 has a temperature of 50° C. or less. In other words, this position is a position in which the hardness of the 3DF 3 formed can be measured instantly.

The positions in which the hardness index measurement devices 25 are installed in the direction of the transport of the 3DF 3 (the vertical direction) are not limited to the positions illustrated in FIG. 2. The installation positions are not particularly limited as long as in the installation positions, it is possible to measure the hardness index of the 3DF 3 which is cooled and solidified such that the 3DF 3 is prevented from being irreversibly deformed. For example, when the hardness index measurement devices 25 are excessively close to the reception plates 22a and 22b, the 3DF 3 is not sufficiently cooled, with the result that it is undesirable to adopt such positions because the 3DF 3 is irreversibly deformed. On the other hand, when the hardness index measurement devices 25 are excessively far from the reception plates 22a and 22b, it is undesirable to adopt such positions because a time lag for controlling the amount of molten filament fed out is prolonged. The number of hardness index measurement devices 25 is not limited to the number illustrated in FIG. 2, and one hardness index measurement device 25 may be provided or a plurality of hardness index measurement devices 25 other than four hardness index measurement devices 25 may be provided. The configuration of the hardness index measurement devices 25 will be further described later.

As shown in FIG. 3, the cooler 20a includes the motor 27 and the motor rotation control portion 28. The motor 27 is a drive portion for the transport member which transports the 3DF 3, and drives, at the same speed, the first endless conveyors 23, the second endless conveyors 24 and the transport rollers 26a to 26g so as to transport the 3DF 3 to the outside of the water tank 21. The motor rotation control portion 28 is an example of a transport control portion, and controls the drive of the motor 27 based on a control signal output from the controller 30.

The controller 30 in FIG. 3 controls the individual constituent portions of the 3DF manufacturing device 1. For example, the controller 30 is an example of a fed amount control portion, and controls, based on measurement data output from the hardness index measurement devices 25, the amount of molten filament 2 fed out per unit time in the extruder 10. The controller 30 includes an input portion 31, a computation portion 32 and an output portion 33.

The input portion 31 receives the measurement data output from the hardness index measurement devices 25.

The computation portion 32 calculates, based on the measurement data received by the input portion 31, optimum setting values for the outputs (screw temperatures) of the screw heaters 17a to 17c, the outputs (die temperatures) of the die heaters 19a to 19e, the numbers of revolutions of the screw motor 13 and the motor 27 and the like. Here, the computation portion 32 may perform computations based on, for example, the average value (such as an arithmetic mean, a geometric mean or a weighted mean) of hardness indexes indicated by the measurement data of the hardness index measurement devices 25a to 25d or may perform computations based on the maximum value or the minimum value thereof. Alternatively, the computation portion 32 may perform computations based on, for example, the average of measurement values other than the maximum value and the minimum value.

The output portion 33 sends the results of the computations of the computation portion 32 to the constituent portions of the 3DF manufacturing device 1. For example, the output portion 33 outputs the optimum setting value for the die temperature to the die temperature control portion 41 and outputs the optimum screw temperature to the screw temperature control portion 42. The output portion 33 also outputs the optimum number of revolutions of the screw motor 13 to the screw motor rotation control portion 61 and outputs the optimum number of revolutions of the motor 27 to the motor rotation control portion 28.

Figure 4A:
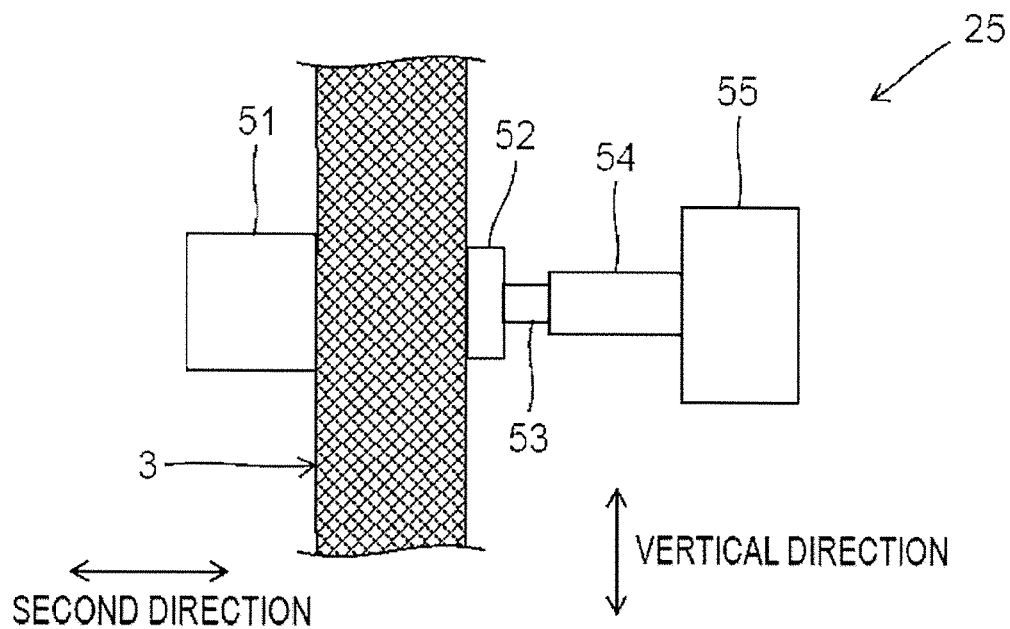
FIG. 4A A configuration diagram showing a state of a hardness index measurement device according to a first embodiment before a measurement.
Figure 4B:
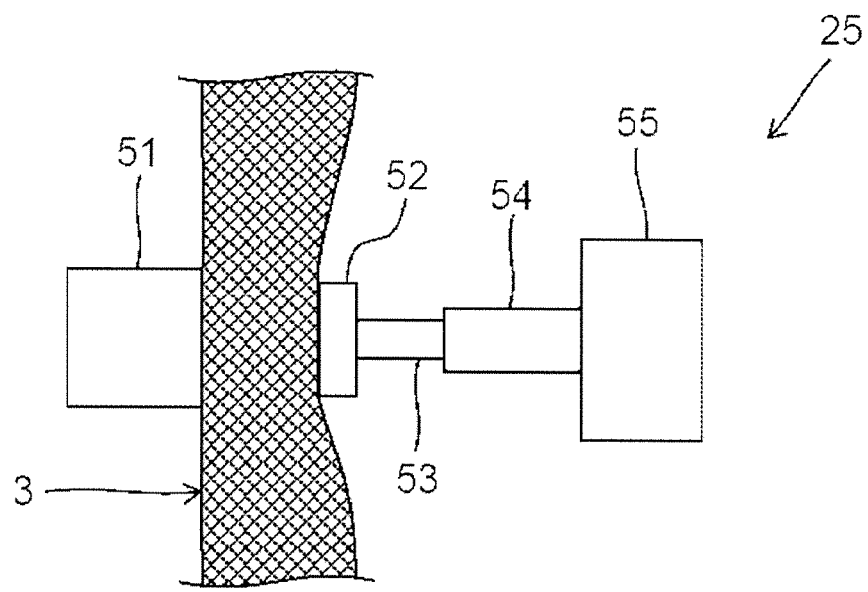
FIG. 4B A configuration diagram showing a state of the hardness index measurement device according to the first embodiment in the measurement.

Then, the configuration of the hardness index measurement devices 25 will further described. FIGS. 4A and 4B are configuration diagrams showing an example of the configuration of the hardness index measurement device 25 according to the first embodiment. The hardness index measurement device 25 includes an opposite member 51, a pressurization member 52, a displacement member 53, a displacement sensor 54 and a pressure supply portion 55.

The opposite member 51 and the pressurization member 52 are an example of a pair of abutting members which are opposite each other. The displacement member 53 is fixed to the pressurization member 52, and presses the pressurization member 52 movably in a horizontal direction (more specifically, the first direction) so as to displace the pressurization member 52. The direction in which the opposite member 51 and the pressurization member 52 are opposite each other coincides with the first direction, and the direction of the pressing of the pressurization member 52 also coincides with the first direction. The displacement sensor 54 supports the displacement member 53 movably in the first direction, and also measures the movement distance (the amount of displacement) of the displacement member 53 (and the pressurization member 52). The pressure supply portion 55 applies a predetermined pressure to the displacement member 53 (and the pressurization member 52).

In a state where the pressurization member 52 abuts on the opposite member 51 through the 3DF 3 (see FIG. 4A), the pressurization member 52 applies a predetermined pressure to the 3DF 3 according to the pressing of the displacement member 53 (see FIG. 4B). The opposite member 51 receives, from the opposite side, the 3DF 3 pressed by the pressurization member 52 so as to prevent the deflection of the 3DF 3. The displacement sensor 54 measures the movement distance (the amount of displacement) of the displacement member 53 (and the pressurization member 52) when the pressurization member 52 applies the predetermined pressure to the 3DF 3 in the state where the opposite member 51 and the pressurization member 52 abut on each other through the 3DF 3. The results of the measurement are sent to the controller 30 as the measurement data indicating the hardness index.

The pressure supply portion 55 in the present embodiment uses a weight (unillustrated) provided outside the water tank 21 so as to apply a constant pressure by hydraulic pressure through a pressure-resistant hose (unillustrated). However, the pressure supply portion 55 is not particularly limited as long as the pressure supply portion 55 can apply a constant pressure. For example, when the hardness index is measured, the weight is used to apply a positive pressure to the displacement member 53 whereas when the hardness index is not measured, the weight is raised up so as to apply a negative pressure to the displacement member 53. In this way, it is possible to measure the hardness index with desired timing.

Figure 5:
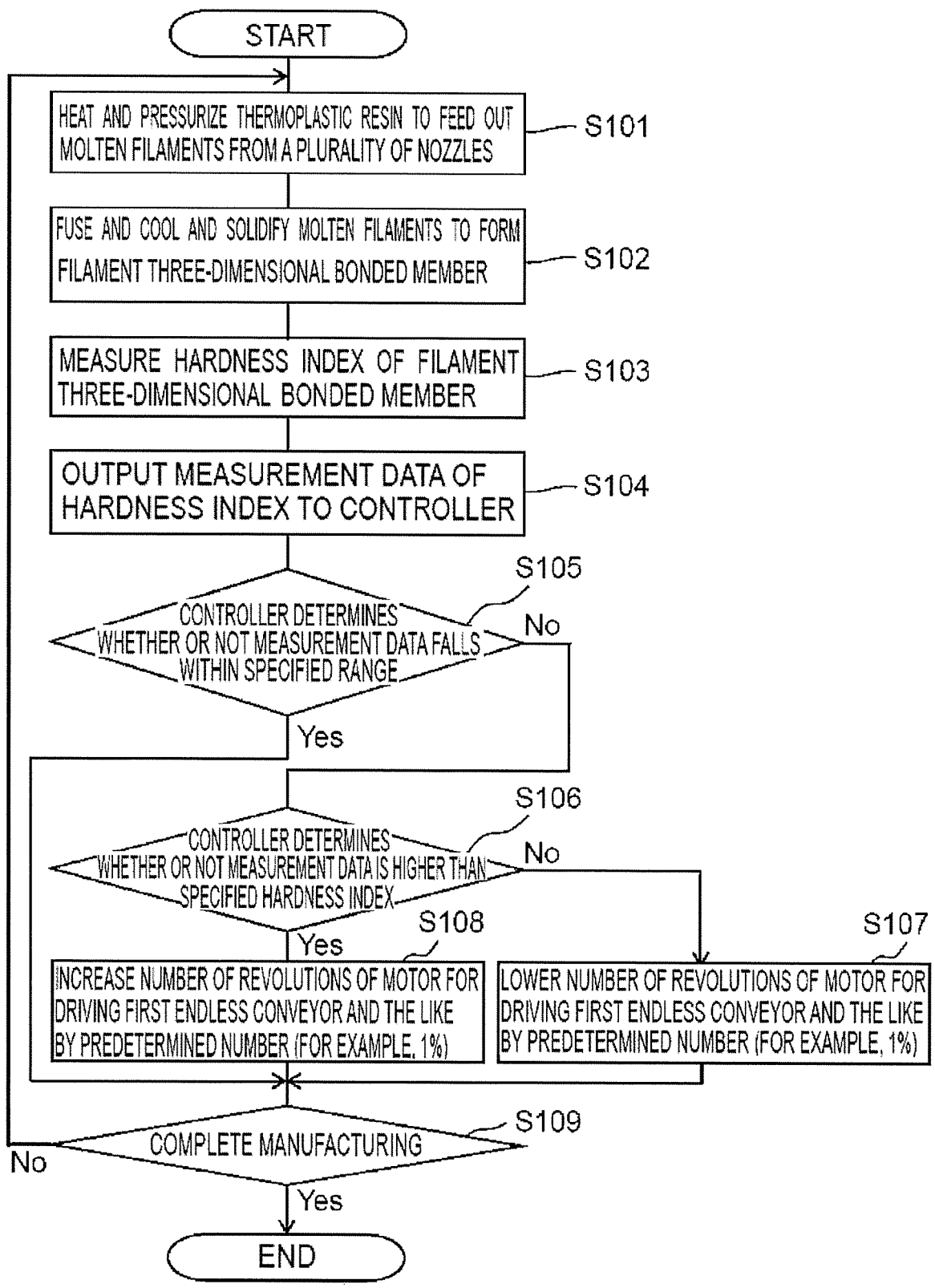
FIG. 5 A flowchart showing an example of a method for manufacturing the filament three-dimensional bonded member according to the first embodiment.

A method for manufacturing the 3DF 3 will then be described. FIG. 5 is a flowchart showing an example of the method for manufacturing the 3DF 3 according to the first embodiment.

The filament density and the hardness index of the 3DF 3 are lowered as the transport speed of the 3DF 3 is increased with the first endless conveyors 23 and the like whereas they are increased as the transport speed of the 3DF 3 is decreased with the first endless conveyors 23 and the like. The flow of FIG. 5 indicates a manufacturing method in which this effect is used to reduce a variation in the density per unit volume of the 3DF 3 and a variation in the hardness index, the hardness index of the 3DF 3 formed with the molten filaments 2 which are fused and cooled and solidified is measured with the hardness index measurement devices 25 provided within the cooler 20a and the transport speed (the transport speed of the transport member as a whole) of the 3DF 3 is controlled based on the obtained measurement data with the first endless conveyors 23 and the like.

First, in step S101, in the extruder 10, the thermoplastic resin input from the hopper 11 is pressurized and transported by the rotation operation of the screw 12 while being melted by being heated within the cylinder 14a, and the molten filaments 2 are fed out from the nozzles of the die 15. In step S102, the molten filaments 2 are fused and cooled and solidified with the formation machine 20, and thus the 3DF 3 is formed. In step S103, the hardness index of the 3DF 3 is measured within the water tank 21. In step S104, the measurement data of the hardness index is output to the controller 30.

In step S105, whether or not the measurement data falls within a specified range is determined by the controller 30. When the measurement data falls within the specified range (yes in step S105), the flow proceeds to step S109, which will be described later. On the other hand, when the measurement data falls outside the specified range (no in step S105), the flow proceeds to step S106.

In step S106, whether the measurement data is higher than a specified hardness index or the measurement data is lower than the specified hardness index is determined by the controller 30.

When the measurement data is lower than the specified hardness index (no in step S106), the flow proceeds to step S107. In step S107, the number of revolutions of the motor 27 for driving the first endless conveyors 23 and the like is lowered by a predetermined number (for example, 1% of the number of revolutions). In this way, the transport speed of the first endless conveyors 23 is decreased, and thus the filament density of the 3DF 3 is increased, with the result that the hardness index is increased (in other words, the 3DF 3 is hardened). Then, the flow of FIG. 5 proceeds to step S109.

On the other hand, when the measurement data is higher than the specified hardness index (yes in step S106), the flow proceeds to step S108. In step S108, the number of revolutions of the motor 27 for driving the first endless conveyors 23 and the like is increased by a predetermined number of revolutions (for example, 1%). In this way, the transport speed of the first endless conveyors 23 is increased, and thus the filament density of the 3DF 3 is lowered, with the result that the hardness index is lowered (in other words, the 3DF 3 is softened). Then, the flow of FIG. 5 proceeds to step S109.

In step S109, whether or not the manufacturing of the 3DF 3 is completed is determined. When the manufacturing is not completed (no in step S109), the flow of FIG. 5 is returned to step S101. On the other hand, when the manufacturing is completed (yes in step S109), the flow of FIG. 5 is completed.

As described above, the device for manufacturing the filament three-dimensional bonded member (3DF) 1 according to the present embodiment is configured so as to include: the molten filament feed device 10 which feeds out a plurality of molten filaments 2; the filament bonding portions 22a and 22b which fuse the molten filaments 2; the filament cooling portion 20a which cools and solidifies the fused molten filaments 2; the transport members 23, 24 and 26a to 26g which transport the filament three-dimensional bonded member (3DF) 3 formed with the molten filaments 2 that are cooled and solidified; the hardness index measurement devices 25 which measure the hardness index of the filament three-dimensional bonded member 3; and the transport control portion 28 which controls, based on the results of the measurement of the hardness index measurement devices 25, the transport speed of the filament three-dimensional bonded member 3 transported by the transport members 23, 24 and 26a to 26g.

The method for manufacturing the filament three-dimensional bonded member (3DF) 3 according to the present embodiment is configured so as to include: a step of feeding out a plurality of molten filaments 2; a step of fusing the molten filaments 2; a step of cooling and solidifying the fused molten filaments 2; a step of transporting the filament three-dimensional bonded member (3DF) 3 formed with the molten filaments 2 that are cooled and solidified; a step of measuring the hardness index of the filament three-dimensional bonded member 3; and a step of controlling, based on the results of the measurement in the step of measuring the hardness index, the transport speed of the filament three-dimensional bonded member 3 in the transporting step.

According to the configuration and the method described above, as the transport speed of the filament three-dimensional bonded member 3 is increased, the filament density per unit volume is lowered, and thus the filament three-dimensional bonded member 3 is softened. By contrast, as the transport speed of the filament three-dimensional bonded member 3 is decreased, the filament density per unit volume is increased, and thus the filament three-dimensional bonded member 3 is hardened. Attention is focused on this point, and thus the hardness index of the filament three-dimensional bonded member 3 formed with the molten filaments 2 that are fused and cooled and solidified is measured with the hardness index measurement devices 25, and thus the transport speed of the filament three-dimensional bonded member 3 is controlled based on the results of the measurement. Hence, it is possible to reduce a variation in the filament density and a variation in the hardness index of the filament three-dimensional bonded member 3. This makes it possible that the hardness thereof is unlikely to be changed when the filament three-dimensional bonded member 3 is manufactured.

In the device for manufacturing the filament three-dimensional bonded member 1 described above, the hardness index measurement device 25 includes: the pair of abutting members 51 and 52 which are opposite each other; the displacement member 53 which displaces at least the abutting member 52 on one side; and the displacement sensor 54 which measures at least the amount of displacement of the abutting member 52 on the one side, and the displacement sensor 54 is configured so as to measure the amount of displacement in the direction of the pressing when a predetermined pressure is applied to the filament three-dimensional bonded member 3 in a state where the pair of abutting members 51 and 52 abut on each other through the filament three-dimensional bonded member 3.

In this configuration, since the hardness index measurement device 25 can be designed so as to be compact, for example, even when a plurality of hardness index measurement devices 25 are installed (see FIG. 2), it is possible to reduce an increase in the size of the device 1. Hence, it is possible to contribute to a reduction in the size of the device 1.

Second Embodiment

The second embodiment will then be described. Configurations differ from those in the first embodiment will be described below. In the same constituent portions as in the first embodiment, the same signs are provided, and the description thereof may be omitted.

Figure 6A:
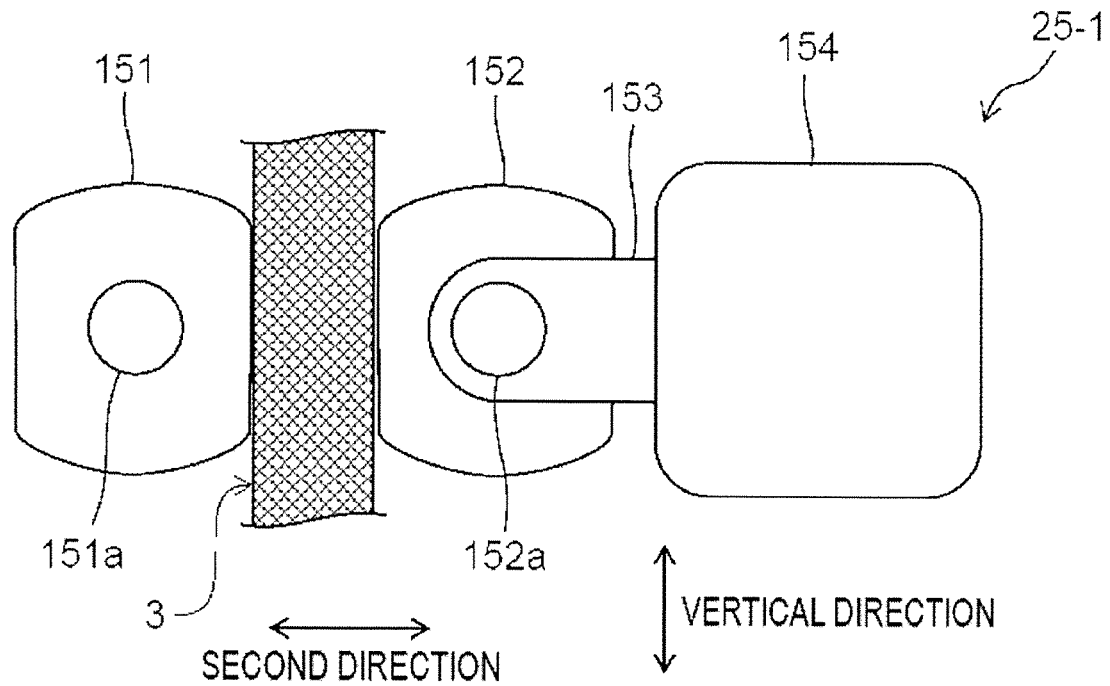
FIG. 6A A configuration diagram of a hardness index measurement device (in a state where a repulsive pressure is not received) according to a second embodiment.
Figure 6B:
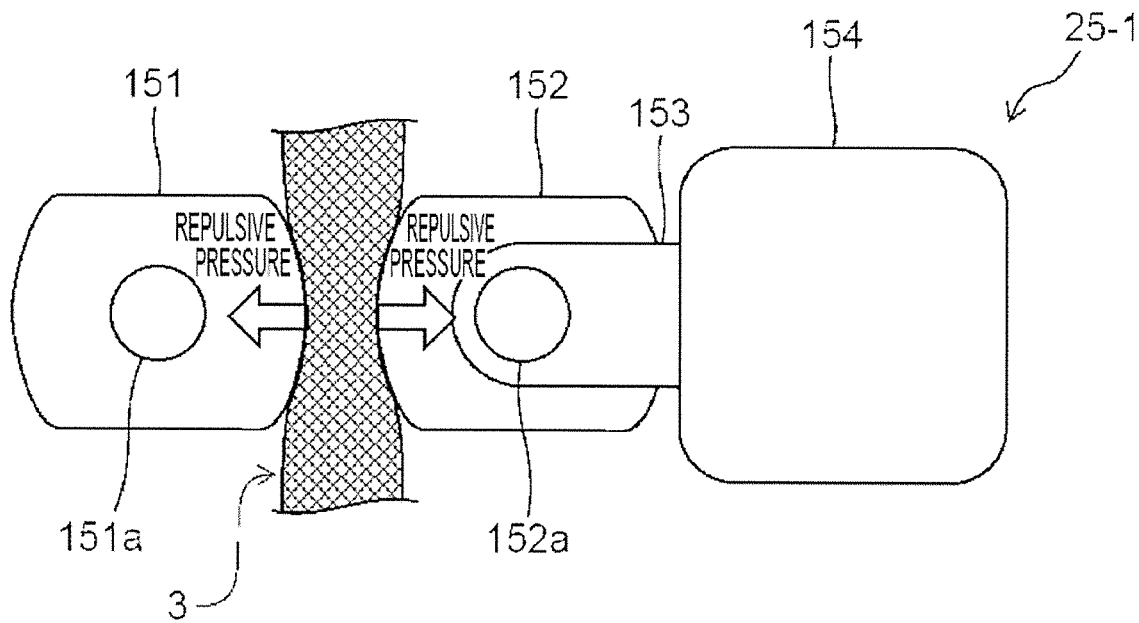
FIG. 6B A configuration diagram of the hardness index measurement device (in a state where the repulsive pressure is received) according to the second embodiment.

FIGS. 6A and 6B are illustrative diagrams showing an example of the configuration of a hardness index measurement device 25-1 according to the second embodiment. Instead of the hardness index measurement device 25 of the first embodiment, in the second embodiment, the hardness index measurement device 25-1 is provided. The hardness index measurement device 25-1 includes a rotation opposite member 151, a rotation pressurization member 152, a pressure sensor 153 and a pressure sensor support portion 154.

The rotation opposite member 151 and the rotation pressurization member 152 are an example of a pair of abutting members which are opposite each other through the 3DF 3 and which can be rotated. The rotation opposite member 151 and the rotation pressurization member 152 are formed in the shape of a quadrangular prism, and the planar shapes thereof when seen from rotation shafts 151a and 152a are rectangles. The pressure sensor 153 measures a repulsive pressure which is received by the rotation pressurization member 152. The pressure sensor support portion 154 supports the pressure sensor 153.

The rotation opposite member 151 and the rotation pressurization member 152 are driven to rotate through the rotation opposite rotation shaft 151a and the pressurization rotation shaft 152a by a drive gear and a drive motor that are not illustrated. An error may occur in the measurement value of the pressure sensor 153 due to a force received from the drive gear when the pressurization rotation shaft 152a is driven. Hence, a configuration can also be adopted in which only the rotation opposite member 151 is driven and in which the rotation pressurization member 152 is not driven (that is, the rotation pressurization member 152 follows the rotation opposite member 151).

The rotation opposite member 151 is rotatably supported by the opposite rotation shaft 151a, and the rotation pressurization member 152 is rotatably supported by the pressurization rotation shaft 152a which can be moved in the opposite direction. The rotation opposite member 151 and the rotation pressurization member 152 are rotated in a state where they abut on each other through the 3DF 3 (FIG. 6A), and thus the abutting surfaces on the 3DF 3 are displaced. By the rotation, the shortest distance therebetween in the opposite direction is changed. As shown in FIG. 6B, when the distance therebetween is narrowed, the rotation opposite member 151 and the rotation pressurization member 152 receive a repulsive pressure from the 3DF 3. The pressure sensor 153 measures the repulsive pressure (FIG. 6B). The results of the measurement (measurement data) are sent to the controller 30.

The configuration of the hardness index measurement device 25-1 is not limited to that illustrated in FIGS. 6A and 6B. For example, although the rotation opposite member 151 and the rotation pressurization member 152 have the same shape in the illustration of FIGS. 6A and 6B, they may have different shapes. At least one of them is preferably formed in the shape of a pillar which has a planar shape with a longitudinal direction and a lateral direction when seen from the rotation shafts 151a and 152a, and for example, the planar shape may be formed in the shape of an oval cylinder. Although in the illustration of FIGS. 6A and 6B, both the rotation opposite member 151 and the rotation pressurization member 152 can be rotated, a configuration may be adopted in which any one of them can be rotated. The pressure sensor 153 may be provided in each of the rotation pressurization member 152 and the rotation opposite member 151.

As described above, in the present embodiment, the device for manufacturing the filament three-dimensional bonded member 1 is configured such that the hardness index measurement device 25 includes the pair of abutting members 151 and 152 which are opposite each other and in which at least one of them can be rotated and the pressure sensor 153 which measures the pressure received by the abutting member 152, the shortest distance between the pair of abutting members 151 and 152 in the opposite direction is changed by the rotation of at least one of the abutting members 151 and 152 and the pressure sensor 153 measures the pressure in the opposite direction when at least one of the abutting members 151 and 152 is rotated in the state where the pair of abutting members 151 and 152 abut on each other through the filament three-dimensional bonded member 3.

In this configuration, at least one of the pair of abutting members 151 and 152 is rotated so as to be able to follow the filament three-dimensional bonded member 3 in the direction of the transport thereof. Hence, when the hardness index of the filament three-dimensional bonded member 3 which is transported through between the pair of abutting members 151 and 152 is measured, it is possible to prevent the occurrence of a deflection and a wrinkle in the filament three-dimensional bonded member 3.

Third Embodiment

The third embodiment will then be described. Configurations differ from those in the first embodiment will be described below. In the same constituent portions as in the first embodiment, the same signs are provided, and the description thereof may be omitted.

Figure 7:
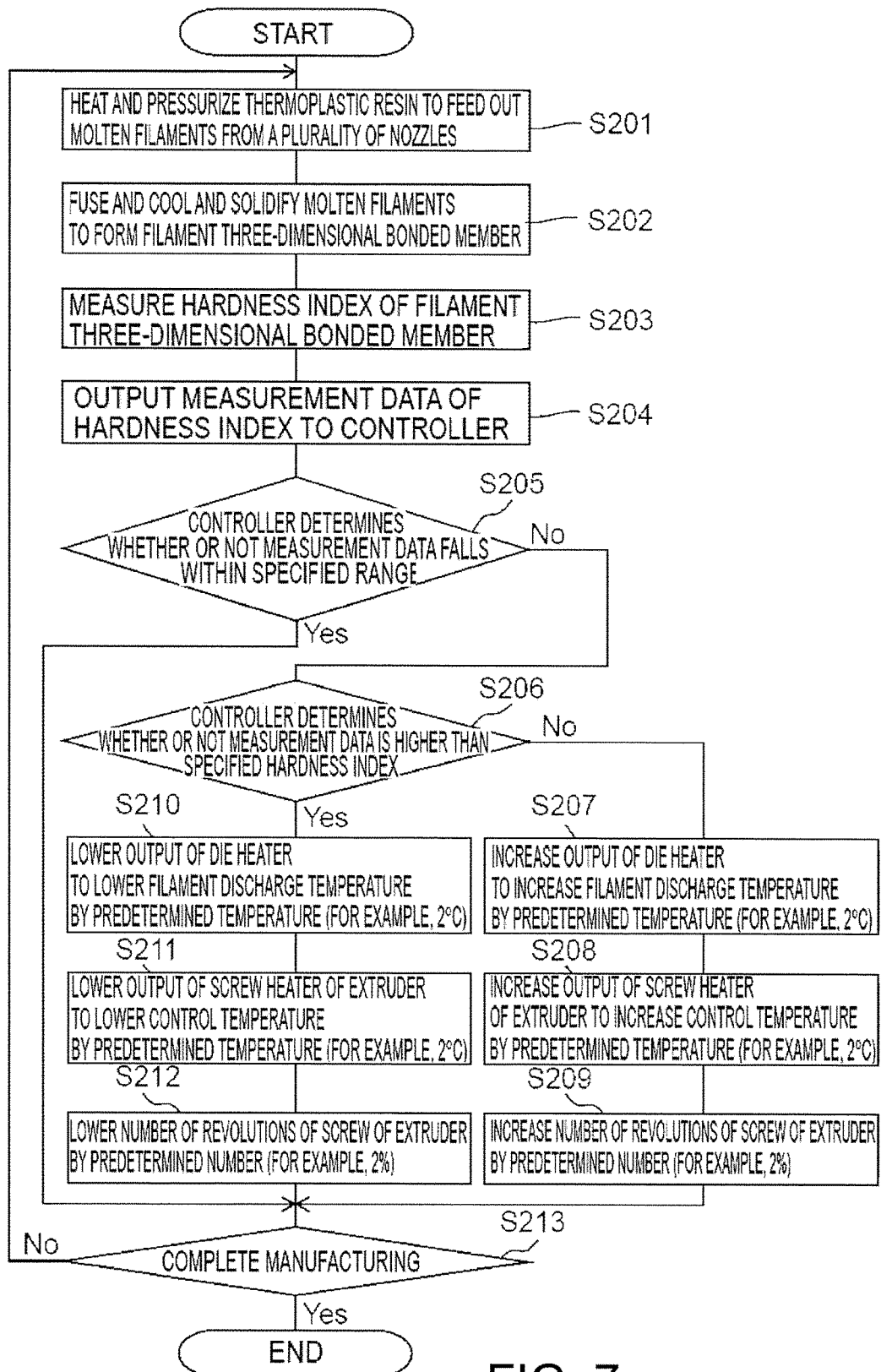
FIG. 7 A flowchart showing an example of a method for manufacturing a filament three-dimensional bonded member according to a third embodiment.

FIG. 7 is a flowchart showing an example of a method for manufacturing a filament three-dimensional bonded member (3DF) 3 according to the third embodiment.

As the temperature of the molten filaments 2 is changed, the viscosity of the molten filaments 2 and the strength of the fusing of the molten filaments 2 are changed. As the viscosity of the molten filaments 2 is changed within the extruder 10, the amount of molten filament 2 which is extruded from the nozzles and which is fed out per unit time is changed, with the result that the filament density per unit volume of the 3DF 3 is changed. Moreover, as the pressure applied to the molten filaments 2 within the extruder 10 is changed, the amount of molten filament 2 which is extruded from the nozzles and which is fed out per unit time is changed. These individually affect the hardness index of the 3DF 3. In the flow of FIG. 7, attention is focused on such a point, and thus the hardness index of the 3DF 3 formed with the molten filaments 2 that are fused and cooled and solidified is measured with the hardness index measurement devices 25 provided within the cooler 20a, and the amount of molten filament 2 fed out in the extruder 10 is controlled based on the obtained measurement data. By this control, a variation in the density per unit volume of the 3DF 3 and a variation in the hardness index are reduced.

First, in step S201, in the extruder 10, the thermoplastic resin input by the hopper 11 is pressurized and transported while being melted by being heated within the cylinder 14a, and thus the molten filaments 2 are fed out from the nozzles of the die 15. In step S202, the molten filaments 2 are fused and cooled and solidified with the formation machine 20, and thus the 3DF 3 is formed. In step S203, the hardness index of the 3DF 3 is measured within the water tank 21. In step S204, the measurement data of the hardness index is output to the controller 30.

In step S205, whether or not the measurement data falls within a specified range is determined by the controller 30. When the measurement data falls within the specified range (yes in step S205), the flow proceeds to step S213, which will be described later. On the other hand, when the measurement data falls outside the specified range (no in step S205), the flow proceeds to step S206.

In step S206, when the measurement data falls within the specified range, whether or not the measurement data is higher than a specified hardness index is determined by the controller 30.

When the measurement data is lower than the specified hardness index (no in step S206), the flow proceeds to step S207. In step S207, the outputs of the die heaters 19a to 19e are increased, and thus the temperature of the molten filaments 2 is increased by a predetermined temperature (for example, 2° C.). Furthermore, in step S208, the outputs of the screw heaters 17a to 17c are increased, and thus the control temperature thereof is increased by a predetermined temperature (for example, 2° C.). In step S209, the number of revolutions of the screw 12 in the extruder 10 is increased by a predetermined number (for example, 2%). Thus, the amount of molten filament 2 fed out per unit time is increased. Then, the flow proceeds to step S213.

On the other hand, when the measurement data is higher than the specified hardness index (yes in step S206), the flow proceeds to step S210. In step S210, the outputs of the die heaters 19a to 19e are lowered, and thus the temperature of the molten filaments 2 is lowered by a predetermined temperature (for example, 2° C.). Furthermore, in step S211, the outputs of the screw heaters 17a to 17c are lowered, and thus the control temperature thereof is lowered by a predetermined temperature (for example, 2° C.). In step S212, the number of revolutions of the screw 12 in the extruder 10 is lowered by a predetermined number (for example, 2%). Thus, the amount of molten filament 2 fed out per unit time is decreased. Then, the flow proceeds to step S213.

In step S213, whether or not the manufacturing of the 3DF 3 is completed is determined. When the manufacturing is not completed (no in step S213), the flow of FIG. 7 is returned to step S201. On the other hand, when the manufacturing is completed (yes in step S213), the flow of FIG. 7 is completed. Although in the flowchart described above, while the values of the temperature sensors provided in the vicinity of the die heaters 19*a* to 19*e* are being monitored, as the temperature of the molten filaments 2, the outputs of the die heaters 19*a* to 19*e* are controlled such that the temperatures detected by the temperature sensors are predetermined values, a method may be adopted in which periodic variations in the molten filaments 2 (the temperatures detected by the temperature sensors) are predicted, and in which thus the outputs of the die heaters 19*a* to 19*e* are controlled such that the range of the variations is decreased.

The 3DF manufacturing device 1 described above is configured so as to include: the molten filament feed device 10 which feeds out a plurality of molten filaments 2; the filament bonding portions 22*a* and 22*b* which fuse the molten filaments 2; the filament cooling portion 20*a* which cools and solidifies the fused molten filaments 2; the hardness index measurement devices 25 which measure the hardness index of the filament three-dimensional bonded member 3 formed with the molten filaments 2 that are cooled and solidified; and the fed amount control portion 30 which controls, based on the results of the measurement of the hardness index measurement devices 25, the amount of molten filament 2 fed out per unit time in the molten filament feed device 10.

In the configuration described above, as the amount of molten filament 2 fed out per unit time is changed, the filament density per unit volume of the 3DF 3 and the hardness index are changed. Attention is focused on this point, and thus the hardness index of the filament three-dimensional bonded member 3 formed with the molten filaments 2 that are fused and cooled and solidified is measured with the hardness index measurement devices 25, and the amount of molten filament 2 fed in the molten filament feed device 10 is controlled based on the results of the measurement. Thus, it is possible to reduce a variation in the filament density and a variation in the hardness index of the filament three-dimensional bonded member 3. This makes it possible that the hardness thereof is unlikely to be changed when the filament three-dimensional bonded member 3 is manufactured.

The method for manufacturing the 3DF 3 according to each of the embodiments described above is configured so as to include: a step of feeding out a plurality of molten filaments 2; a step of fusing the molten filaments 2; a step of cooling and solidifying the fused molten filaments 2; a step of measuring the hardness index of the filament three-dimensional bonded member 3 formed with the molten filaments 2 that are cooled and solidified; and a step of controlling, based on the results of the measurement in the step of measuring the hardness index, the amount of molten filament 2 fed out per unit time in the step of feeding out the molten filaments 2.

Although on the method for manufacturing the 3DF 3, different types of control are performed between the first embodiment (see FIG. 5) and the third embodiment (see FIG. 7), both the types of control may be performed with the same device. Specifically, a configuration may be adopted in which the control (S107 and S108 in FIG. 5) on the transport speed of the 3DF 3 based on the results of the measurement of the hardness index measurement devices 25 is performed according to whether or not the measurement data of the hardness index measurement devices 25 is higher than the specified hardness index, and in which the control (S207 to S209 and S210 to S212 in FIG. 7) on the amount of molten filament 2 fed out per unit time based on the results of the measurement is also performed.

In the method for manufacturing the 3DF 3 according to the first embodiment, the number of revolutions of the motor 27 is increased (S108) or decreased (S107) by the predetermined number on an individual basis according to whether or not the measurement data of the hardness index measurement devices 25 is higher than the specified hardness index (S106 in FIG. 5). However, instead of this method, in S107 and S108 of FIG. 5, the number of revolutions of the motor 27 may be increased or decreased by a value calculated according to a difference between the measurement data (the measurement value of the hardness index) and the specified hardness index.

In the method for manufacturing the 3DF 3 according to the third embodiment, the outputs of the die heaters 19*a* to 19*e* and the screw heaters 17*a* to 17*c* and the number of revolutions of the screw 12 are individually increased (S207 to S209) or decreased (S210 to S212) by the predetermined numbers on an individual basis according to whether or not the measurement data of the hardness index measurement devices 25 is higher than the specified hardness index (S206 in FIG. 7). However, instead of this method, in S207 to S209 and S210 to S212 of FIG. 7, the outputs of the die heaters 19*a* to 19*e* and the screw heaters 17*a* to 17*c* and the number of revolutions of the screw 12 may be increased or decreased by values calculated according to a difference between the measurement data (the measurement value of the hardness index) and the specified hardness index.

Fourth Embodiment

The fourth embodiment will then be described. Configurations differ from those in the first embodiment will be described below. In the same constituent portions as in the first embodiment, the same signs are provided, and the description thereof may be omitted.

Figure 8:
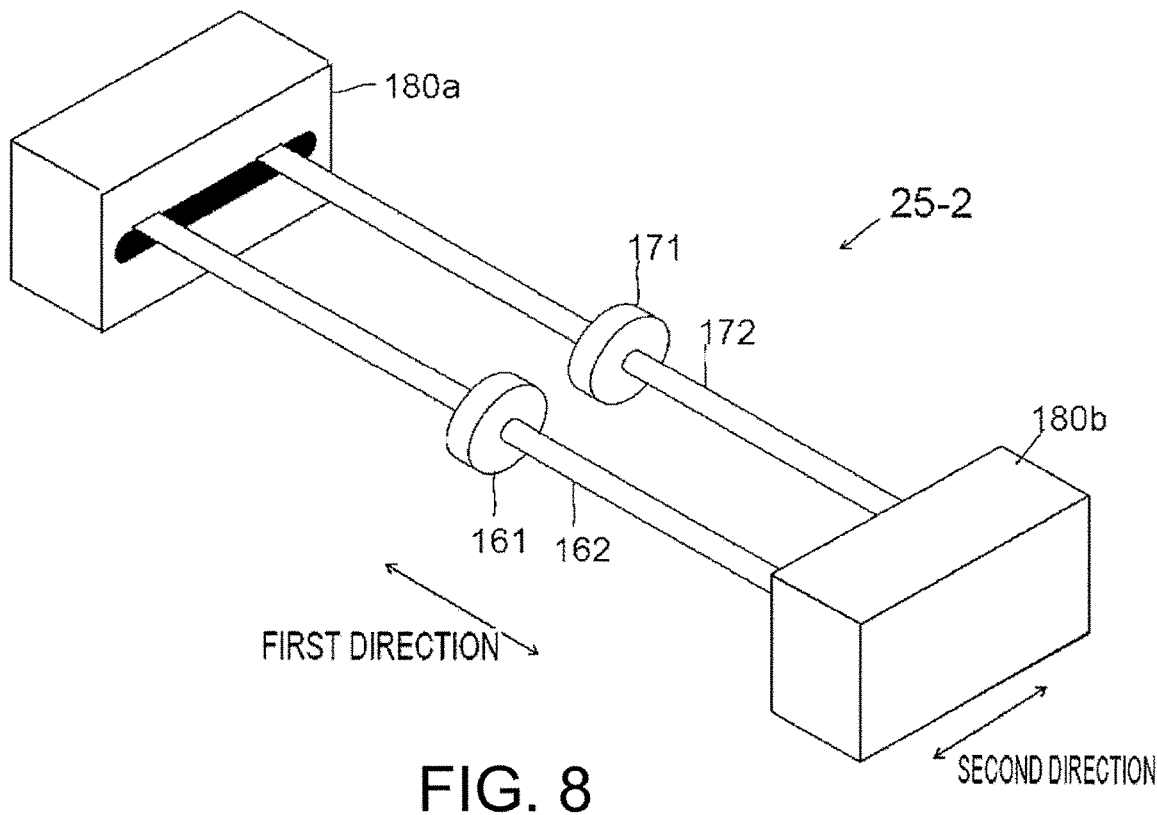
FIG. 8 A perspective view of a hardness index measurement device according to a fourth embodiment.
Figure 9:
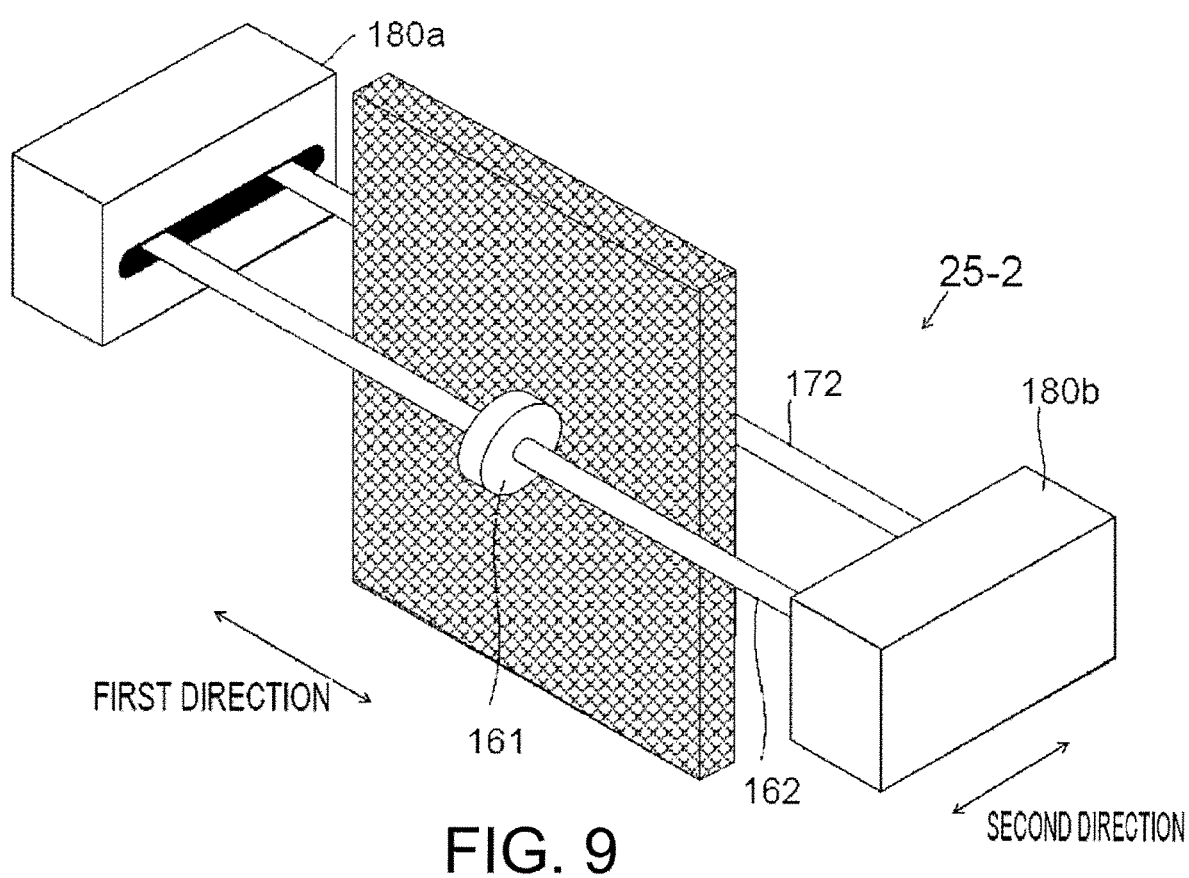
FIG. 9 A perspective view of the hardness index measurement device according to the fourth embodiment in another state.
Figure 10A:
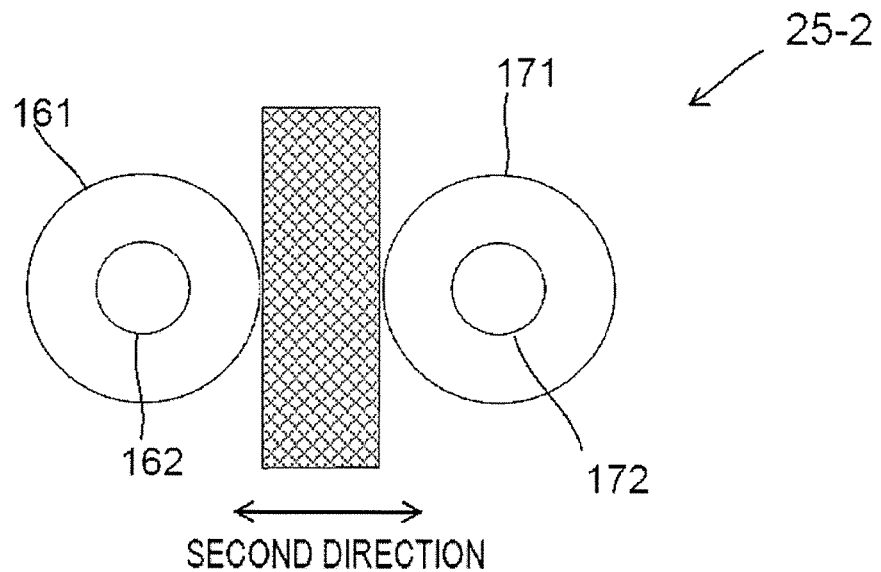
FIG. 10A A configuration diagram of the hardness index measurement device according to the fourth embodiment.
Figure 10B:
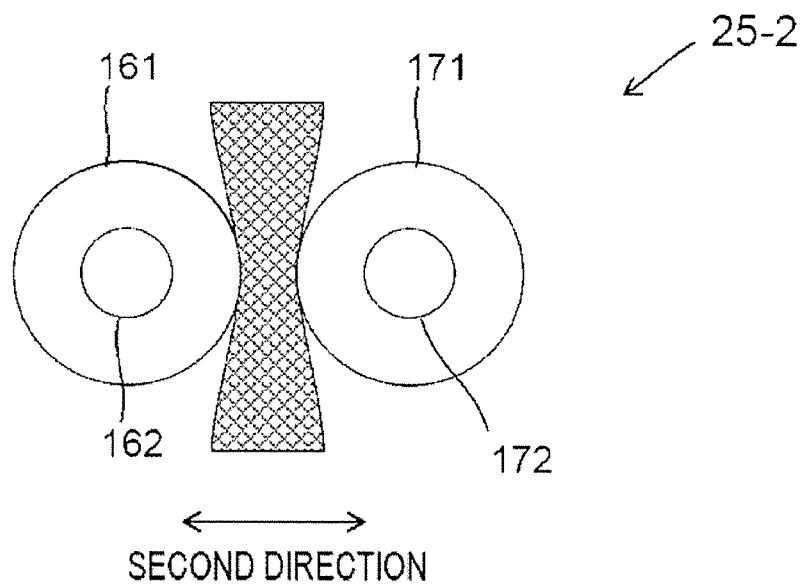
FIG. 10B A configuration diagram of the hardness index measurement device according to the fourth embodiment in another state.

FIG. 8 is a perspective view of a hardness index measurement device 25-2 according to the fourth embodiment. FIG. 9 is a perspective view of the hardness index measurement device 25-2 in a state where the 3DF 3 is sandwiched. FIGS. 10A and 10B are configuration diagrams when the hardness index measurement device 25-2 is seen in the first direction. Instead of the hardness index measurement device 25 in the first embodiment, in the fourth embodiment, the hardness index measurement device 25-2 is provided. The hardness index measurement device 25-2 includes a first circular plate member 161, a first rotation shaft 162, a second circular plate member 171, a second rotation shaft 172 and a pair of support members 180*a* and 180*b*.

Each of the first rotation shaft 162 and the second rotation shaft 172 is a rod-shaped member which is extended in the first direction, and they are supported by the pair of support members 180*a* and 180*b* so as to be aligned with the second direction through the transport path of the 3DF 3. More specifically, the pair of support members 180*a* and 180*b* are provided so as to be opposite each other in the first direction through the transport path of the 3DF 3. One ends of the rotation shafts 162 and 172 are supported by the support member 180a, and the other ends of the rotation shafts 162 and 172 are supported by the support member 180b.

The first circular plate member 161 is a member in the shape of a circular plate which is provided near the center of the first rotation shaft 162 in the longitudinal direction thereof so as to be coaxial with the first rotation shaft 162. The second circular plate member 171 is a member in the shape of a circular plate which is provided near the center of the second rotation shaft 172 in the longitudinal direction thereof so as to be coaxial with the second rotation shaft 172. The circular plate members 161 and 171 are arranged opposite each other through the 3DF 3 in the second direction.

The pair of support members 180a and 180b rotatably support the rotation shafts 162 and 172, and uses an unillustrated hydraulic system and thereby can move the rotation shafts 162 and 172 in such a direction that they approach each other. In this way, the distance between the rotation shafts 162 and 172 is changed to a predetermined value (value smaller than the thickness of the 3DF 3), and thus it is possible to change the state of the rotation shafts 162 and 172 from a state where the 3DF 3 is not compressed (see FIG. 10A) to a state where the 3DF 3 is compressed in the second direction (see FIG. 10B).

The circular plate members 161 and 171 in the state shown in FIG. 10B are rotated at a speed corresponding to the transport speed of the 3DF 3 while pressing the 3DF 3 in the second direction. Each of the support members 180a and 180b includes a pressure sensor which measures a repulsive force between the rotation shafts 162 and 172. The pressure sensor continuously measures the repulsive force, and outputs information on the measured value to the controller 30 as information indicating the hardness index of the 3DF 3.

As described above, the hardness index measurement device 25-2 according to the present embodiment is a repulsive force measurement device of a continuous measurement type in which the outer circumferential surfaces of the circular plates 161 and 171 are brought into intimate contact with the 3DF 3, and can continuously acquire the information on the hardness index of the 3DF 3. Since the circular plate members 161 and 171 are rotated according to the transport speed of the 3DF 3, friction occurring between the circular plate members 161 and 171 and the 3DF 3 is minimized. In the hardness index measurement device 25-2, the specific specifications of the circular plate members 161 and 171 such as the position, the number and the width dimension (dimension in the first direction) of the outer circumferential surface may be changed as necessary.

Fifth Embodiment

Figure 11:
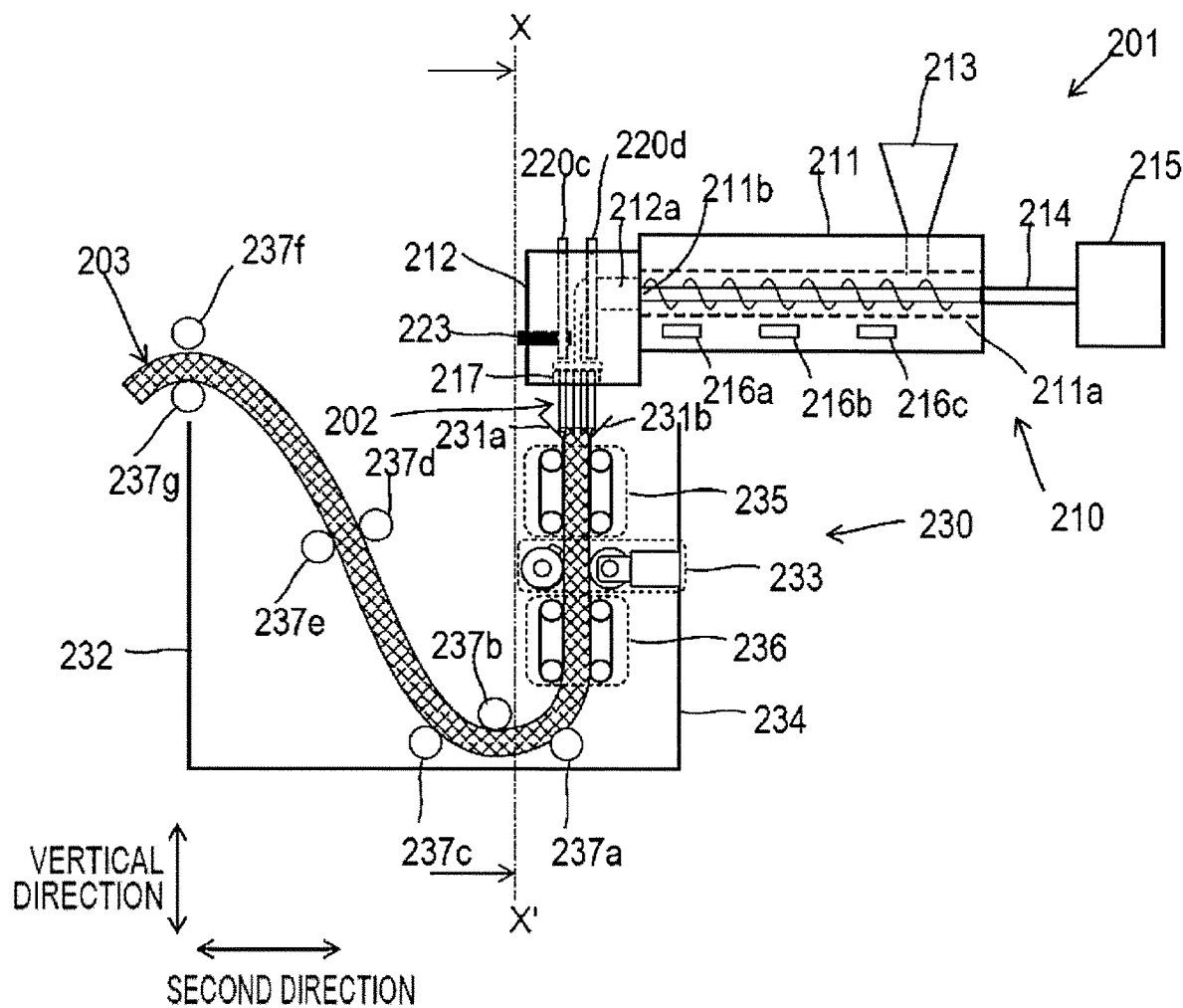
FIG. 11 A configuration diagram of a device for manufacturing a filament three-dimensional bonded member according to a fifth embodiment.
Figure 12:
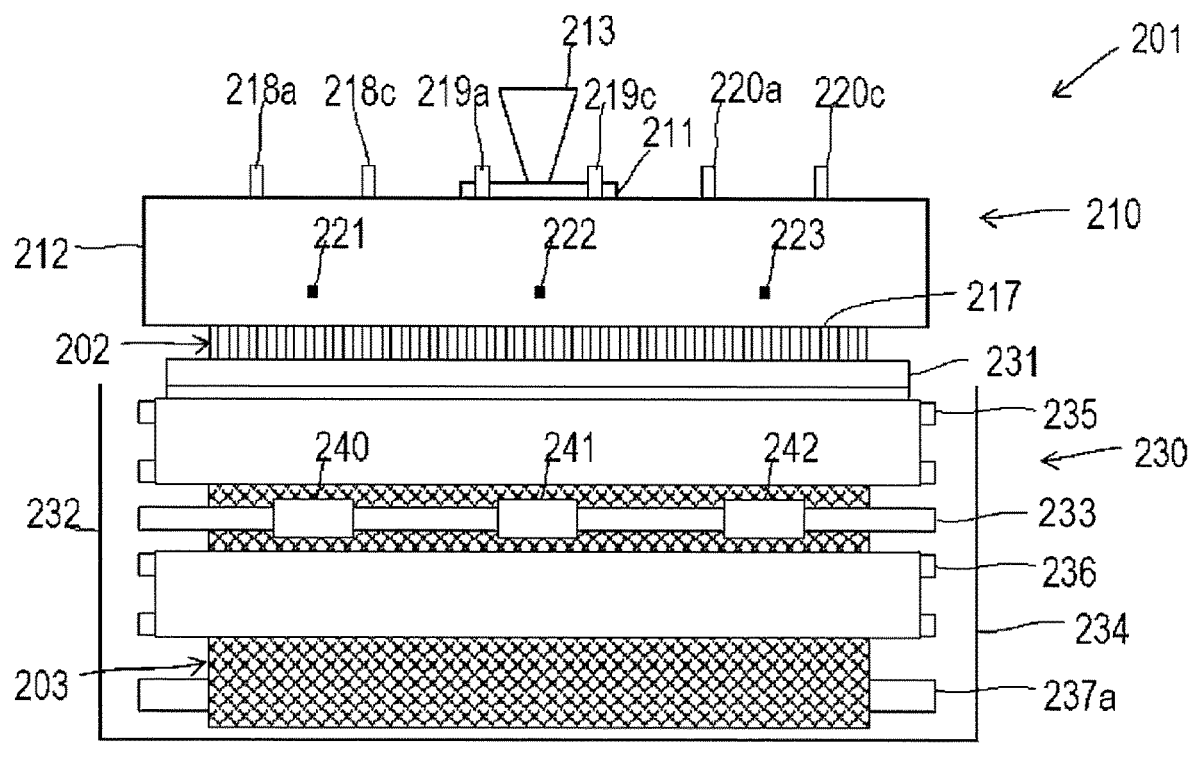
FIG. 12 A cross-sectional view taken along line X-X' indicated by arrows in the device for manufacturing the filament three-dimensional bonded member shown in FIG. 11.
Figure 13:
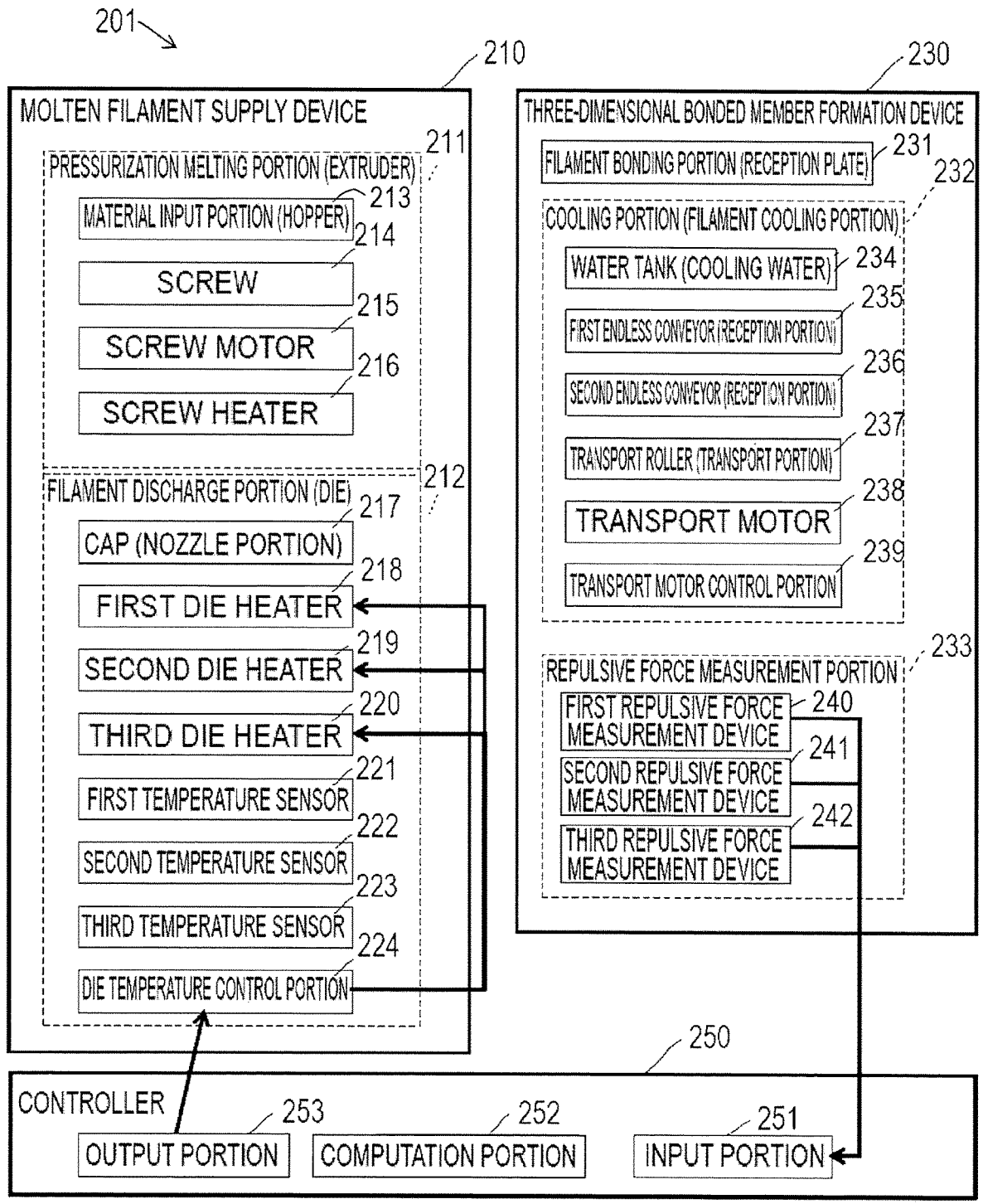
FIG. 13 A block diagram of the device for manufacturing the filament three-dimensional bonded member shown in FIG. 11.

The fifth embodiment will then be described. FIG. 11 is a configuration diagram of a device for manufacturing a filament three-dimensional bonded member 201 according to the present embodiment. FIG. 12 is a cross-sectional view taken along line X-X' indicated by arrows in the device for manufacturing the filament three-dimensional bonded member 201 shown in FIG. 11. FIG. 13 is a block diagram of the device for manufacturing the three-dimensional bonded member 201.

The device for manufacturing the filament three-dimensional bonded member 201 is a device for manufacturing a filament three-dimensional bonded member 203 which has a solid network structure and which is formed with thermoplastic resin fibers, and includes: a molten filament supply device 210; a three-dimensional bonded member formation device 230; and a controller 250 (which is not shown in FIGS. 11 and 12). The filament three-dimensional bonded member 203 is also referred to as a 3DF 203. The device for manufacturing the filament three-dimensional bonded member 201 is also referred to as a 3DF manufacturing device 201.

In the molten filament supply device 210, a pressurization melting portion 211 (extruder) and a filament discharge portion 212 (die) are provided. The pressurization melting portion 211 includes a material input portion 213 (hopper) for inputting the thermoplastic resin serving as the material of the filament, a screw 214, a screw motor 215 and screw heaters 216a, 216b and 216c (these are collectively referred to as the "screw heater 216").

In a cylinder 211a formed within the pressurization melting portion 211, the screw 214 which is rotated by the screw motor 215 is inserted, and on the outer circumference of the cylinder 211a, the screw heater 216 is provided. The screw 214 transports, to the filament discharge portion 212, the thermoplastic resin which is melted by being heated with the screw heater 216 while pressurizing the thermoplastic resin. As described above, the pressurization melting portion 211 heats and melts, within the cylinder 211a, the thermoplastic resin supplied from the material input portion 213, and thereafter supplies it as the molten thermoplastic resin from a cylinder discharge port 211b to the filament discharge portion 212.

The filament discharge portion 212 feeds out the molten thermoplastic resin transported from the pressurization melting portion 211 as a fibrous molten filament 202. In the filament discharge portion 212, a cap 217 in which a nozzle group consisting of a plurality of nozzles is formed, a first die heater 218, a second die heater 219, a third die heater 220, a first temperature sensor 221, a second temperature sensor 222, a third temperature sensor 223 and a die temperature control portion 224 are provided. In the filament discharge portion 212, a guide flow path 212a is formed which guides, to the cap 217, the molten thermoplastic resin discharged from the pressurization melting portion 211. The configuration of the guide flow path 212a and the like will be described in detail again.

The cap 217 is formed in the shape of a rectangular parallelepiped which is long in the horizontal first direction (that coincides with the left/right direction of FIG. 12 and that corresponds to the direction of the width of the 3DF 203) and which is short in the horizontal second direction (that coincides with the left/right direction of FIG. 11 and that corresponds to the direction of the thickness of the 3DF 203) perpendicular to the first direction. The specific dimensions of the shape of the rectangular parallelepiped are, for example, about 1 to 2 in in the first direction, about 10 to 20 cm in the second direction and about 4 to 10 cm in the direction (that is the direction of the thickness and that coincides with the vertical direction) perpendicular to these directions. In the cap 217, a plurality of nozzles are formed so as to be extended in the vertical direction, and a plurality of filaments 202 in a molten state are discharged from the nozzles. The nozzles are arranged substantially in a grid pattern when seen from below such that a plurality of nozzles are aligned both in the first direction and the second direction.

Each of the first to third die heaters 218 to 220 is formed with four heaters (first die heaters 218a to 218d, second die heaters 219a to 219d and third die heaters 220a to 220d). The first temperature sensor 221 is arranged so as to measure the temperature of the center portion of the first die heater 218, the second temperature sensor 222 is arranged so as to measure the temperature of the center portion of the second die heater 219 and the third temperature sensor 223 is arranged so as to measure the temperature of the center portion of the third die heater 220.

The die temperature control portion 224 controls the outputs of the first to third die heaters 218 to 220 while monitoring the temperatures measured by the first to third temperature sensors 221 to 223. In this way, it is possible to control the temperatures of the molten thermoplastic resin around the first to third temperature sensors 221 to 223 and thereby control the temperature of the molten filaments 202. In the molten filament supply device 210, an unillustrated screw temperature control portion which controls the output of the screw heater 216 is also provided.

The three-dimensional bonded member formation device 230 includes a filament bonding portion 231, a cooling portion 232 and a repulsive force measurement portion 233, and fuses and cools and solidifies a plurality of molten filaments so as to form the 3DF 203.

The filament bonding portion 231 is formed with a pair of reception plates 231a and 231b which are inclined toward the center portion (so as to form an inverted letter "V" when seen in the first direction) and which are arranged opposite each other, and are provided below the nozzle group of the cap 217 in the vertical direction. The reception plates 231a and 231b temporarily retain the molten filaments 202, and also facilitate the buoyancy action of cooling water within a water tank 234 and the fusing of the molten filaments 202. In the upper portions of the reception plates 231a and 231b, cooling water supply water absorption devices (unillustrated) for supplying the cooling water to the entire surfaces of the reception plates 231a and 231b may be provided. The cooling water is supplied, and thus the temperature of the reception plates 231a and 231b is prevented from being increased, with the result that it is possible to prevent the molten filaments 202 from being fused to the reception plates 231a and 231b.

In the present embodiment, the reception plates 231a and 231b are bent toward the vertical direction halfway through the inclination surfaces thereof, and are arranged with a predetermined distance provided in the second direction (the direction of the thickness of the 3DF 203). The dimension of the 3DF 203 in the direction of the thickness thereof and the like are adjusted by the reception plates 231a and 231b.

The cooling portion 232 includes: the water tank 234 where the cooling water is stored; a pair of first endless conveyors 235 and a pair of second endless conveyors 236 which transport the 3DF 203; a plurality of transport rollers 237a to 237g (these are collectively referred to as the "transport roller 237"); and a transport motor 238. The transport motor 238 drives, through an unillustrated gear, the first endless conveyors 235, the second endless conveyors 236 and the transport rollers 237a to 237g, and is operated and controlled by a transport motor control portion 239.

The pair of first endless conveyors 235 are arranged parallel to each other below the reception plates 231a and 231b in the vertical direction so as to be opposite each other through the 3DF 203 with a predetermined distance provided. The pair of second endless conveyors 236 are arranged parallel to each other on the downstream side of the transport of the first endless conveyors 235 (downward in the present embodiment) so as to be opposite each other through the 3DF 203 with a predetermined distance provided. The cooling portion 232 cools and solidifies the three-dimensionally bonded molten filaments (the molten filaments after the formation of three-dimensional bonding) so as to form the 3DF 203.

The repulsive force measurement portion 233 includes: a first repulsive force measurement device 240 which is provided below the first temperature sensor 221 in the vertical direction; a second repulsive force measurement device 241 which is provided below the second temperature sensor 222 in the vertical direction; and a third repulsive force measurement device 242 which is provided below the third temperature sensor 223 in the vertical direction. These repulsive force measurement devices 240 to 242 are an example of a hardness index measurement device which measures the hardness index of the 3DF 203. The repulsive force measurement portion 233 measures repulsive forces at the left end portion, the center portion and the right end portion (that are respectively the left end, the center and the right end of FIG. 12) of the 3DF 203 in the direction of the width thereof, and transmits the measurement data thereof to the controller 250 as the hardness index.

The controller 250 includes: an input portion which receives the measurement data output from the repulsive force measurement devices 240 to 242; a computation portion which calculates the optimum control temperature based on the measurement data; an output portion which transmits the optimum control temperature to the die temperature control portion 224. The controller 250 controls, based on the measurement data output from the repulsive force measurement devices 240 to 242, the temperature of the molten thermoplastic resin within the die corresponding to the left end portion, the center portion and the right end portion of the 3DF 203 in the direction of the width, and thereby controls the hardnesses of the 3DF 203 at the left end portion, the center portion and the right end portion in the direction of the width.

In the present embodiment, the repulsive force measurement devices 240 to 242 are arranged between the first endless conveyors 235 and the second endless conveyors 236 so as to be aligned horizontally in the direction of the width. The repulsive force measurement devices 240 to 242 individually measure the hardness index of the 3DF 203 transmitted from the first endless conveyors 235.

The positions in which the repulsive force measurement devices 240 to 242 are installed in the direction of the transport of the 3DF 203 (the vertical direction) are not limited to the positions in the embodiment described above. However, when the repulsive force measurement devices 240 to 242 are excessively close to the filament bonding portion 231, the 3DF 203 is not sufficiently cooled, with the result that it is undesirable to adopt such positions because the compressed portion of the 3DF 203 is irreversibly deformed. On the other hand, when the repulsive force measurement devices 240 to 242 are excessively far from the filament bonding portion 231, it is undesirable to adopt such positions because a time lag for controlling the amount of molten filament discharged is prolonged. With consideration given to these points, it is preferable to install the repulsive force measurement devices 240 to 242 in appropriate positions.

Figure 14A:
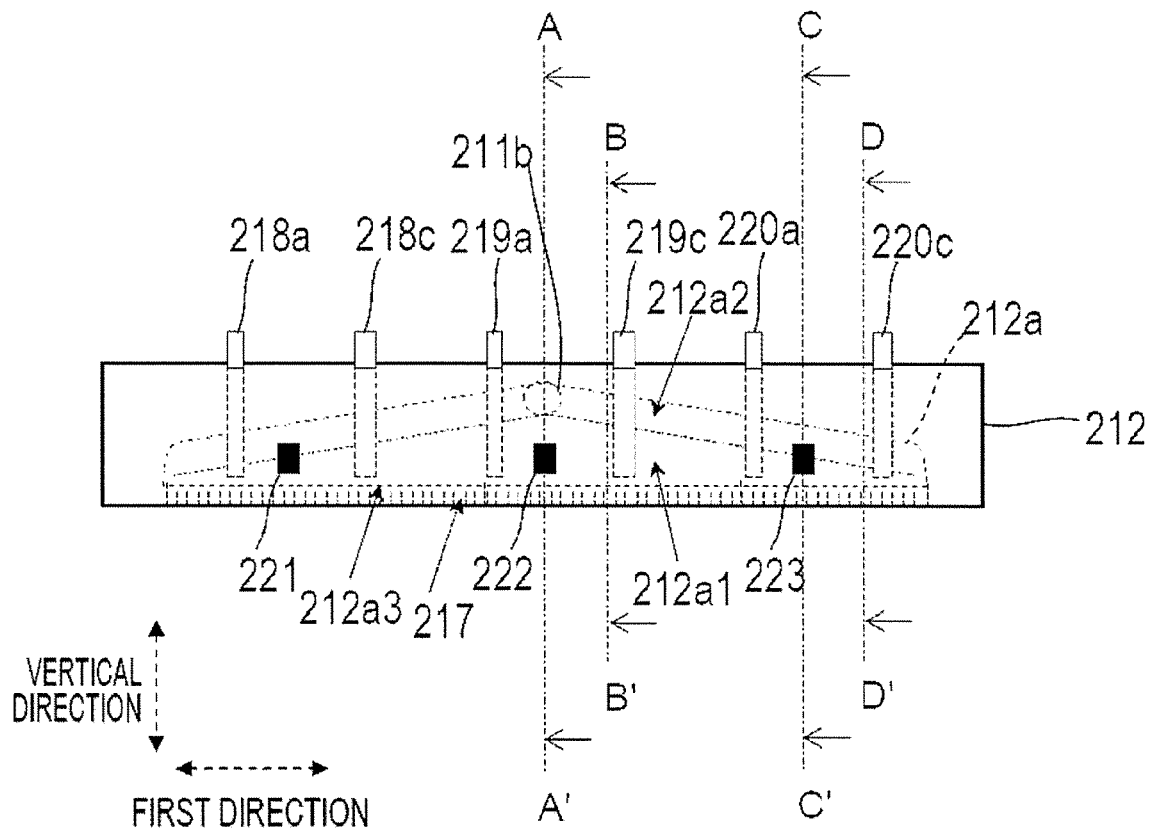
FIG. 14A An enlarged view of a filament discharge portion (die) shown in FIG. 11.
Figure 14B:
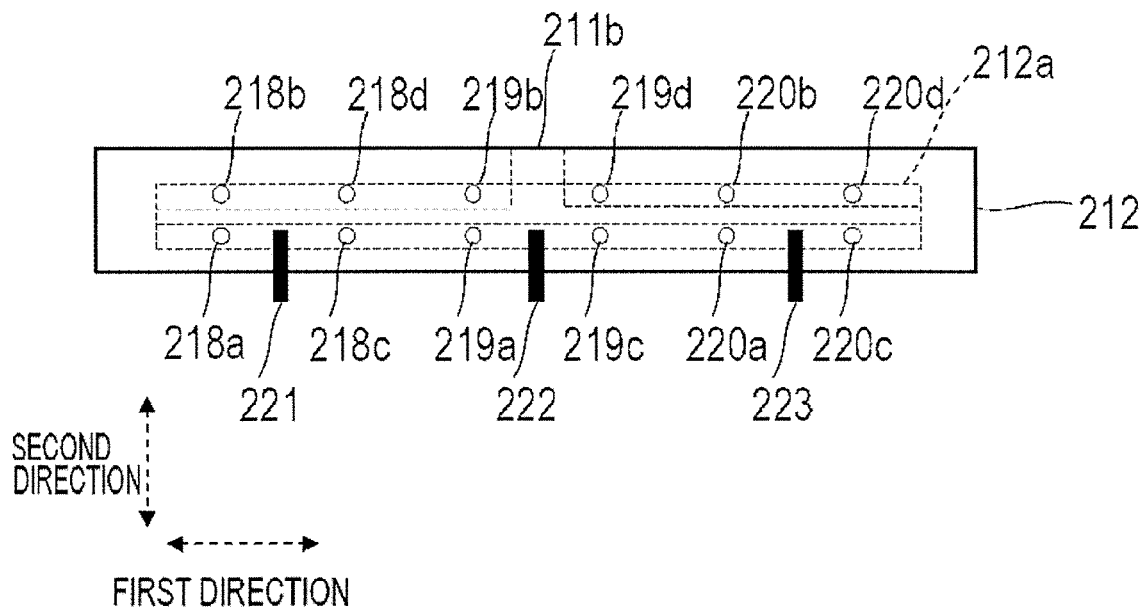
FIG. 14B A top view of the filament discharge portion (die) shown in FIG. 14A.

FIG. 14A is an enlarged view of the filament discharge portion 212 shown in FIG. 11, and FIG. 14B is a top view of the filament discharge portion shown in FIG. 14A. FIGS. 15A to 15D are respectively a cross-sectional view taken along line A-A' indicated by arrows, a cross-sectional view taken along line B-B' indicated by arrows, a cross-sectional view taken along line C-C' indicated by arrows and a cross-sectional view taken along line D-D' indicated by arrows in the filament discharge portion 212 shown in FIG. 14A.

As shown in FIGS. 14A and 14B and FIGS. 15A to 15D, a guide flow path 212a which is formed within the filament discharge portion 212 includes a flat guide flow portion 212a1. The flat guide flow portion 212a1 is wide in the first direction (the left/right direction of FIGS. 14A and 14B), and is narrow in the second direction (the left/right direction of FIGS. 15A to 15D). More specifically, the dimension of the flat guide flow portion 212a1 in the first direction is increased as the flat guide flow portion 212a1 is extended downward, and the dimension of the lowermost portion is substantially equal to the dimension of the cap 217 in the first direction. The dimension of the flat guide flow portion 212a1 in the second direction is equal to or less than the half of the dimension of the cap 217 in the second direction. As described above, in the flat guide flow portion 212a1, the dimension in the second direction is set sufficiently small such that it is possible to accurately control, with the die heaters 218 to 220, the temperature of the molten thermoplastic resin which is passed through the position corresponding to each of the die heaters.

The thickness of the guide flow path of the flat guide flow portion 212a1 (which corresponds to the dimension in the second direction in the present embodiment) is preferably set equal to or more than 1 mm but equal to or less than 20 mm, and is more preferably set equal to or more than 2 mm but equal to or less than 7 mm. When the thickness of the guide flow path exceeds 20 mm, it is difficult to control the temperature of the molten thermoplastic resin whereas when the thickness of the guide flow path is less than 1 mm, a resistance when the molten thermoplastic resin is passed through the interior of the guide flow path is increased, and thus the discharge rate of the molten filament is easily varied. The length of the guide flow path of the flat guide flow portion 212a1 (the length in the vertical direction) is preferably equal to or more than 50 mm but equal to or less than 300 mm. When the length of the guide flow path is less than 50 mm, a variation in the temperature of the molten thermoplastic resin is easily produced whereas when the length of the guide flow path exceeds 300 mm, the size of the device is increased excessively and disadvantageously. As described above, the flat guide flow portion 212a1 is formed so as to be thin, and thus it is possible to efficiently transmit the heat of the die heaters 218 to 220 to the molten thermoplastic resin therewithin and thereby accurately control the temperature of the molten thermoplastic resin.

In the present embodiment, the twelve die heaters (the first die heaters 218a to 218d, the second die heaters 219a to 219d and the third die heaters 220a to 220d, which are extended in the vertical direction) are, as shown in FIG. 14B, arranged so as to be aligned along the front and rear walls (walls which are extended in the first direction) of the flat guide flow portion 212a1. As described above, the die heaters 218 to 220 are evenly spaced in the first direction along the flat guide flow portion 212a1.

A specific description will be given with reference to FIG. 14B. In the vicinity of a part of the flat guide flow portion 212a1 close to the left end, on the left side, the two first die heaters 218a and 218b are arranged opposite each other through the flat guide flow portion 212a1 in the second direction, and on the right side, the remaining first die heaters 218c and 218d are arranged opposite each other through the flat guide flow portion 212a1 in the second direction. In the vicinity of a part of the flat guide flow portion 212a1 close to the center, on the left side, the two second die heaters 219a and 219b are arranged opposite each other through the flat guide flow portion 212a1 in the second direction, and on the right side, the remaining second die heaters 219c and 219d are arranged opposite each other through the flat guide flow portion 212a1 in the second direction. In the vicinity of a part of the flat guide flow portion 212a1 close to the right end, on the left side, the two third die heaters 220a and 220b are arranged opposite each other through the flat guide flow portion 212a1 in the second direction, and on the right side, the remaining third die heaters 220c and 220d are arranged opposite each other through the flat guide flow portion 212a1 in the second direction.

The first temperature sensor 221 is arranged in a position for measuring the temperature of the center portion of each of the first die heaters 218a to 218d, the second temperature sensor 222 is arranged in a position for measuring the temperature of the center portion of each of the second die heaters 219a to 219d and the third temperature sensor 223 is arranged in a position for measuring the temperature of the center portion of each of the third die heaters 220a to 220d. In this way, the temperature sensors 221 to 223 are arranged along the flat guide flow portion 212a1 in the first direction.

Furthermore, as shown in FIGS. 14A and 14B, in the upper portion (on the upstream side) of the flat guide flow portion 212a1 in the vertical direction, a tubular guide flow portion 212a2 whose width is wider than that of the flat guide flow portion 212a1 (the dimension in the second direction) is fo Hied from the center portion toward both end portions in the first direction so as to form a downhill slope (see FIG. 14A). In other words, the guide flow path 212a includes the tubular guide flow portion 212a2 which is widened in the second direction as compared with the flat guide flow portion 212a1, and the tubular guide flow portion 212a2 is extended along the upper edge of the flat guide flow portion 212a1 in the vertical direction.

The center portion of the tubular guide flow portion 212a2 in the first direction forms a coupling port which is connected to the cylinder discharge port 211b, and the molten thermoplastic resin is fed out from the pressurization melting portion 211 thereto. In the configuration described above, the molten thermoplastic resin fed from the cylinder discharge port 211b to the guide flow path 212a can be directly fed to the flat guide flow portion 212a1 or can be fed through the tubular guide flow portion 212a2 to the flat guide flow portion 212a1.

As compared with the flow speed of the molten thermoplastic resin which is passed through the interior of the flat guide flow portion 212a1, within the tubular guide flow portion 212a2, the flow speed of the molten thermoplastic resin is decreased, and thus in a state where a reservoir is formed, the internal pressure is stabilized. Thus, it is possible to reduce a pulsation in which the flow speed of the molten thermoplastic resin within the flat guide flow portion 212a1 is changed little by little.

As shown in FIGS. 15A to 15D, on the upper side of the cap 217, an extended guide flow portion 212a3 is formed which is extended thinly both in the first direction and the second direction so as to be connected to the entire nozzle group. The dimensions of the extended guide flow portion 212a3 and the cap 217 both in the first direction and the second direction are substantially equal to each other. The lower end of the flat guide flow portion 212a1 is continuously connected to the center position of the extended guide flow portion 212a3 in the second direction. In this way, the molten thermoplastic resin which is passed through the flat guide flow portion 212a1 can be supplied through the extended guide flow portion 212a3 to all the nozzles.

The molten thermoplastic resin which is passed through the part of the flat guide flow portion 212a1 close to the left side (which is significantly affected by the first die heater 218) is supplied to the nozzles close to the left side of the cap 217, and is easily used for the formation of the part of the 3DF 203 close to the left side. The hardness index of this part is measured with the first repulsive force measurement device 240 provided close to the left side.

The molten thermoplastic resin which is passed through the part of the flat guide flow portion 212a1 close to the center (which is significantly affected by the second die heater 219) is supplied to the nozzles close to the center of the cap 217, and is easily used for the formation of the part of the 3DF 203 close to the center. The hardness index of this part is measured with the second repulsive force measurement device 241 provided close to the center.

The molten thermoplastic resin which is passed through the part of the flat guide flow portion 212a1 close to the right side (which is significantly affected by the third die heater 220) is supplied to the nozzles close to the right side of the cap 217, and is easily used for the formation of the part of the 3DF 203 close to the right side. The hardness index of this part is measured with the third repulsive force measurement device 242 provided close to the right side.

Figure 16A:
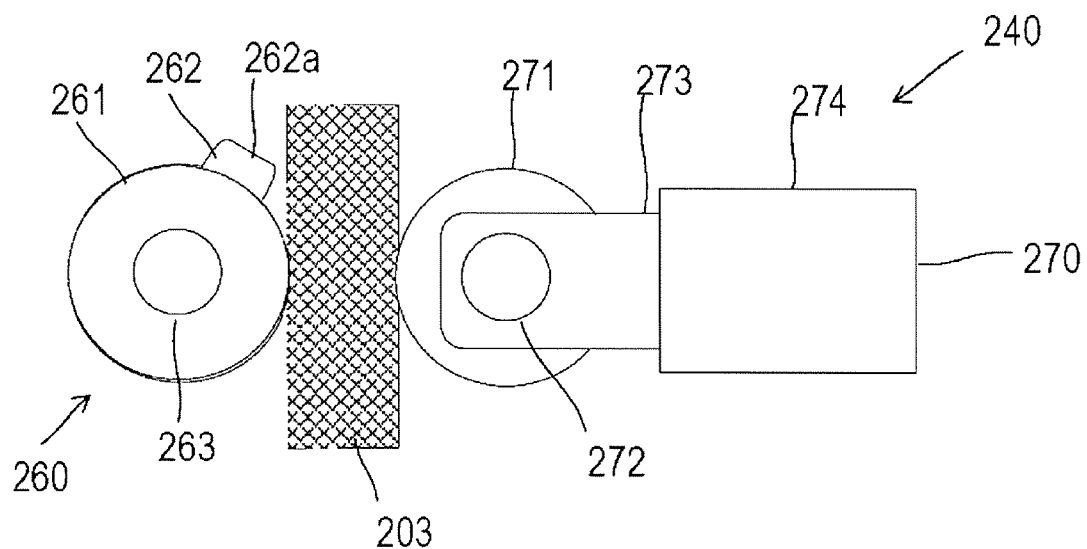
FIG. 16A An enlarged view of a repulsive force measurement device shown in FIG. 11.
Figure 16B:
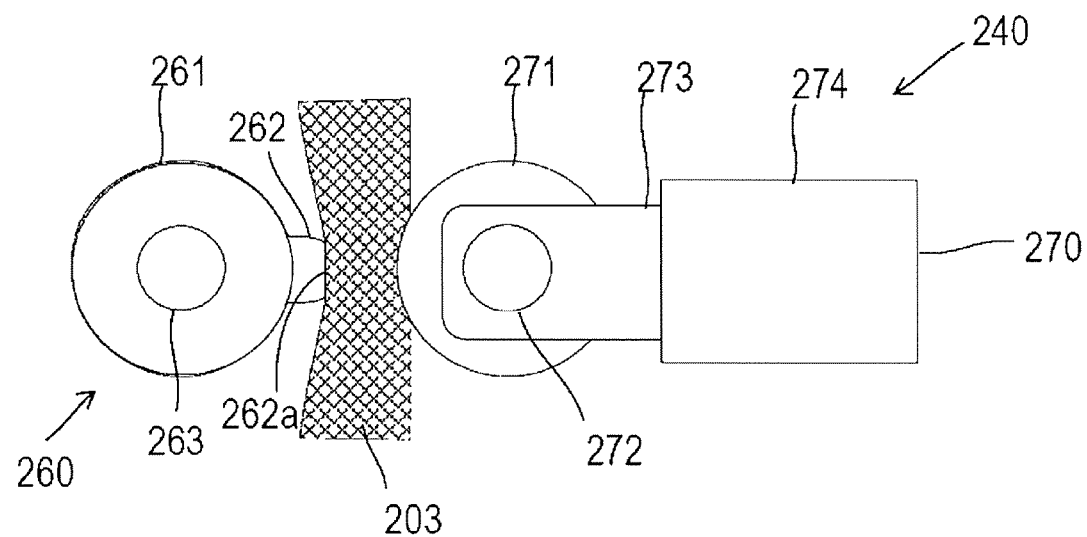
FIG. 16B An enlarged view of a repulsive force measurement device shown in FIG. 11.
Figure 17A:
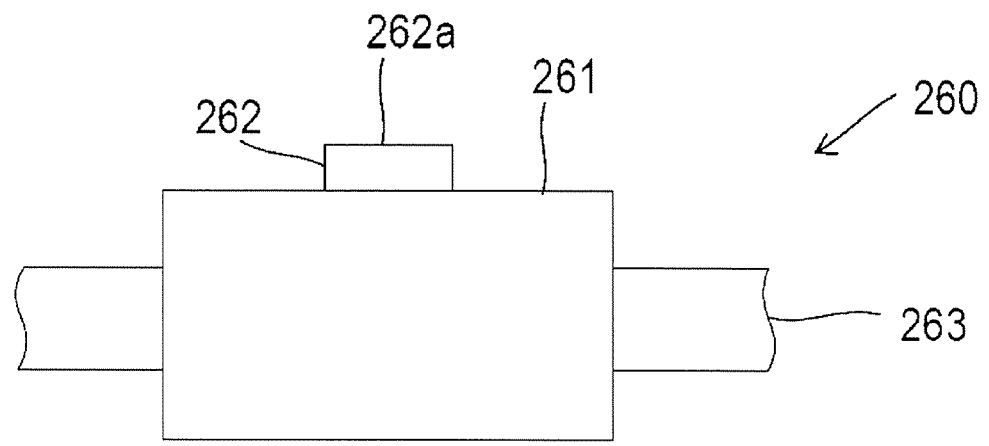
FIG. 17A A side view of a pressurization portion of the repulsive force measurement device shown in FIG. 16A.
Figure 17B:
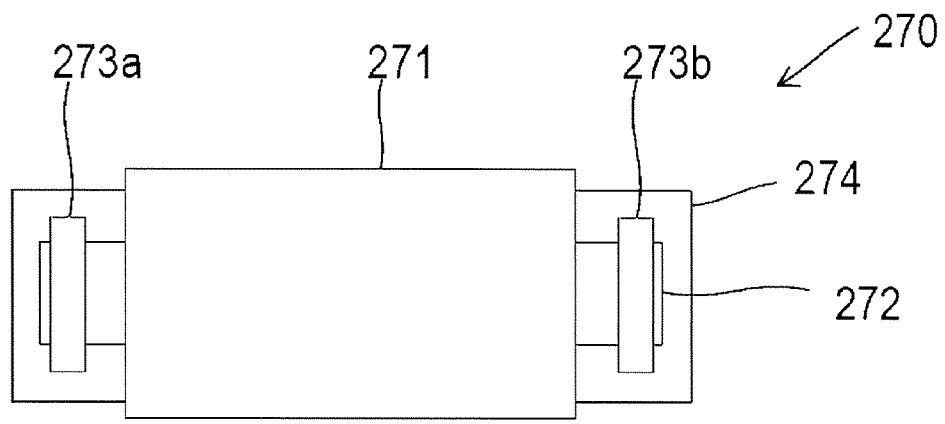
FIG. 17B A side view of a repulsive force measurement portion of the repulsive force measurement device shown in FIG. 16A.

FIGS. 16A and 16B are enlarged views of the first repulsive force measurement device 240 in the 3DF manufacturing device 201 shown in FIG. 11. FIG. 16A shows a state where the 3DF 203 is not compressed, and FIG. 16B shows a state where the 3DF 203 is compressed. FIG. 17 are left side views of the first repulsive force measurement device 240 shown in FIG. 16A. FIG. 17A is a left side view of a pressurization portion 260, and FIG. 17B is a left side view of a repulsive force measurement portion 270. Since all the repulsive force measurement devices 240 to 242 have the same structure, the structure of the first repulsive force measurement device 240 will be described here as a typical example, and the description of the structures of the other repulsive force measurement devices 241 and 242 will be omitted.

The first repulsive force measurement device 240 includes the pressurization portion 260 and the repulsive force measurement portion 270, and is provided in a position in which the 3DF 203 fed is sandwiched. The pressurization portion 260 includes: a cylindrical rotation pressurization member 261 which has a protrusion portion 262 whose pressurization surface 262a is displaced; and a first rotation shaft 263 which supports it rotatably. The rotation pressurization member 261 is rotated by a friction force with the 3DF 203 which is transported.

The repulsive force measurement portion 270 includes: a cylindrical rotation member 271; a second rotation shaft 272 which supports it rotatably; two bearing portions 273 (273a and 273b) which rotatably support the second rotation shaft 272 at both ends thereof; and a pressure measurement portion 274. The pressure measurement portion 274 supports the two bearing portions 273 (273a and 273b), and also includes a pressure sensor (unillustrated) which measures a force (pressure) received by the rotation member 271 from the 3DF 203. The rotation member 271 is rotated by a friction force with the 3DF 203 which is transported.

As shown FIG. 16A, when the pressurization surface 262a of the protrusion portion 262 in the rotation pressurization member 261 is brought into contact with the 3DF 203, the 3DF 203 is compressed between the pressurization surface 262a and the rotation member 271 of the repulsive force measurement portion 270, and a repulsive force at that time is measured with the pressure measurement portion 274.

The data (measurement data) of the results of the measurement by the pressure measurement portion 274 is output as the hardness index to the controller 250. Although in the present embodiment, the protrusion portion for applying a compression force to the 3DF 203 is provided on the side of the pressurization portion 260, the protrusion portion may be provided on the side of the repulsive force measurement portion 270 or may be provided on both the sides. In order for the friction force with the 3DF 203 to be enhanced, projections and recesses are preferably provided on the surfaces of the rotation pressurization member 261 and the rotation member 271.

Figure 18:
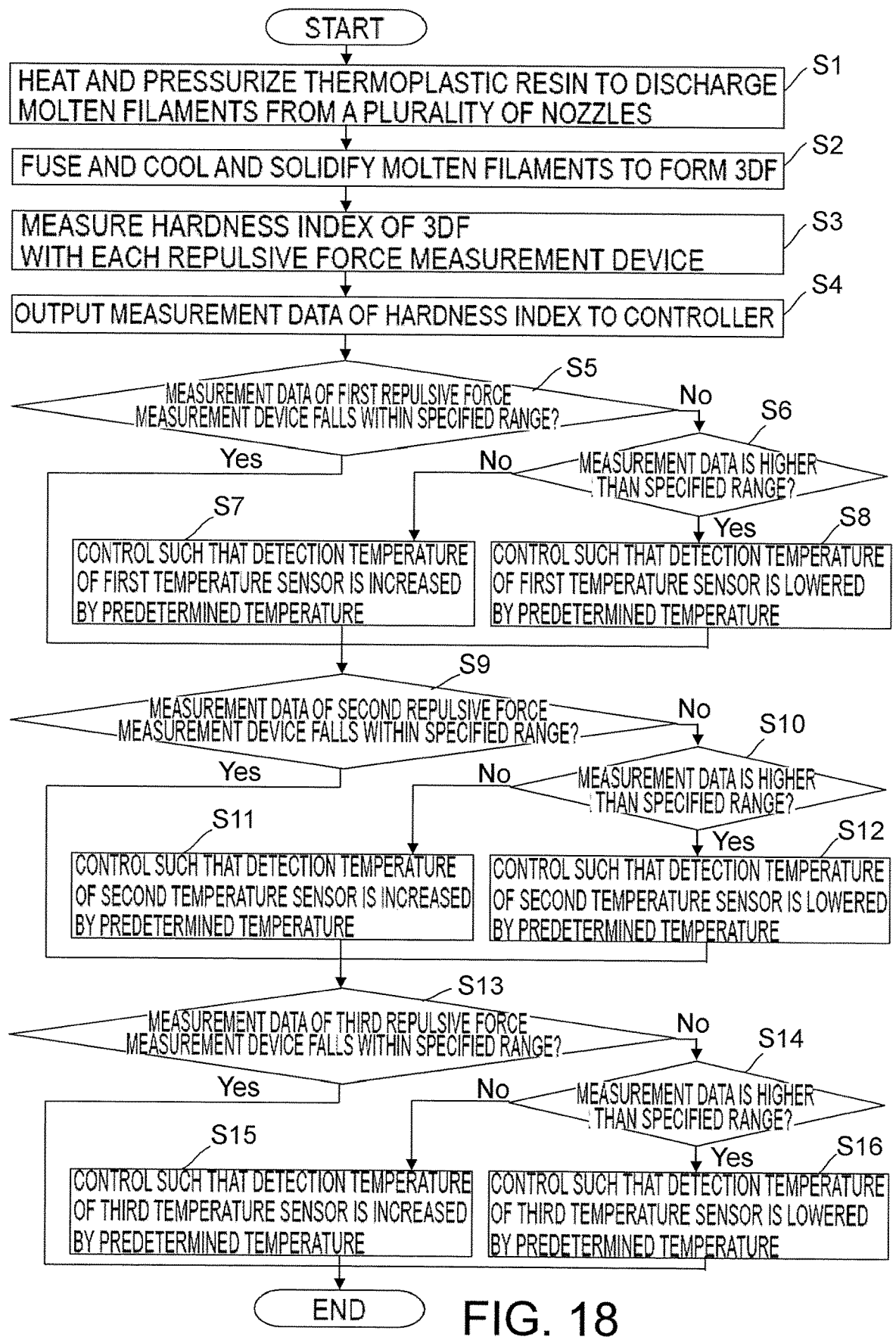
FIG. 18 A flowchart showing an example of a method for manufacturing a filament three-dimensional bonded member according to fifth embodiment.

FIG. 18 is a flowchart showing an example of a method for manufacturing a filament three-dimensional bonded member according to an embodiment of the present invention. Although the manufacturing method can be practiced with the 3DF manufacturing device 201 described previously, the manufacturing method or a manufacturing method in accordance therewith may be practiced with another manufacturing device or the like. The flow of the manufacturing method with the 3DF manufacturing device 201 will be described below with reference to FIG. 18.

First, as the processing of step S1, the molten filament supply device 210 heats and pressurizes the thermoplastic resin so as to discharge the molten filaments 202 from a plurality of nozzles in the cap 217. Furthermore, as the processing of step S2, the three-dimensional bonded member formation device 230 fuses and cools and solidifies the discharged molten filaments 202 so as to form the 3DF 203.

Then, as the processing of step S3, the repulsive force measurement devices 240 to 242 measure the hardness index of the 3DF 203. Furthermore, as the processing of step S4, the repulsive force measurement portion 233 outputs the measurement data of the hardness index (the measurement data of the first to third repulsive force measurement devices 240 to 242) to the controller 250.

As the processing of step S5, the controller 250 determines whether or not the measurement data of the first repulsive force measurement device 240 falls within a specified range R1. The specified range R1 corresponds to, for example, an allowable range with reference to the intended hardness index of the 3DF 203 in a position corresponding to the first repulsive force measurement device 240. As a result of the determination in step S5, when the measurement data falls within the specified range R1 (yes in step S5), the flow proceeds to the processing of step S9 whereas when the measurement data falls outside the specified range R1 (no in step S5), the flow proceeds to the processing of step S6.

As the processing of step S6, the controller 250 determines whether or not the measurement data of the first repulsive force measurement device 240 is higher than the specified range R1. As a result, when the measurement data is lower than the specified range R1 (that is, when the measurement data falls outside the specified range R1 so as to be lower than the specified range R1), the flow proceeds to the processing of step S7. In step S7, the output of the first die heater 218 is controlled (such as the change of the setting of a target temperature) such that the detection temperature of the first temperature sensor 221 is increased by a predetermined temperature (for example, 1° C.), and the flow proceeds to the processing of step S9. Here, a necessary adjustment may be performed on the outputs of the other die heaters.

On the other hand, when the measurement data of the first repulsive force measurement device 240 is higher than the specified range R1 (that is, when the measurement data falls outside the specified range R1 so as to be higher than the specified range R1), the flow proceeds to the processing of step S8. In step S8, the output of the first die heater 218 is controlled (such as the change of the setting of the target temperature) such that the detection temperature of the first temperature sensor 221 is decreased by a predetermined temperature (for example, 1° C.), and the flow proceeds to the processing of step S9. Here, a necessary adjustment may be performed on the outputs of the other die heaters.

In the processing of steps S6 to S8, when the measurement data of the first repulsive force measurement device 240 falls outside the specified range R1 so as to be lower than the specified range R1 (that is, when the 3DF 203 is excessively softened), the control is performed such that the output of the first die heater 218 is increased whereas when the measurement data of the first repulsive force measurement device 240 falls outside the specified range R1 so as to be higher than the specified range R1 (that is, when the 3DF 203 is excessively hardened), the control is performed such that the output of the first die heater 218 is lowered.

Then, as the processing of step S9, the controller 250 determines whether or not the measurement data of the second repulsive force measurement device 241 falls within a specified range R2. The specified range R2 corresponds to, for example, an allowable range with reference to the intended hardness index of the 3DF 203 in a position corresponding to the second repulsive force measurement device 241. As a result of the determination in step S9, when the measurement data falls within the specified range R2 (yes in step S9), the flow proceeds to the processing of step S13 whereas when the measurement data falls outside the specified range R2 (no in step S9), the flow proceeds to the processing of step S10.

As the processing of step S10, the controller 250 determines whether or not the measurement data of the second repulsive force measurement device 241 is higher than the specified range R2. As a result, when the measurement data is lower than the specified range R2 (that is, when the measurement data falls outside the specified range R2 so as to be lower than the specified range R2), the flow proceeds to the processing of step S11. In step S11, the output of the second die heater 219 is controlled (such as the change of the setting of the target temperature) such that the detection temperature of the second temperature sensor 222 is increased by a predetermined temperature (for example, 1° C.), and the flow proceeds to the processing of step S13. Here, a necessary adjustment may be performed on the outputs of the other die heaters.

On the other hand, when the measurement data of the second repulsive force measurement device 241 is higher than the specified range R2 (that is, when the measurement data falls outside the specified range R2 so as to be higher than the specified range R2), the flow proceeds to the processing of step S12. In step S12, the output of the second die heater 219 is controlled (such as the change of the setting of the target temperature) such that the detection temperature of the second temperature sensor 222 is decreased by a predetermined temperature (for example, 1° C.), and the flow proceeds to the processing of step S13. Here, a necessary adjustment may be performed on the outputs of the other die heaters.

In the processing of steps S10 to S12, when the measurement data of the second repulsive force measurement device 241 falls outside the specified range R2 so as to be lower than the specified range R2 (that is, when the 3DF 203 is excessively softened), the control is performed such that the output of the second die heater 219 is increased whereas when the measurement data of the second repulsive force measurement device 241 falls outside the specified range R2 so as to be higher than the specified range R2 (that is, when the 3DF 203 is excessively hardened), the control is performed such that the output of the second die heater 219 is lowered.

Then, as the processing of step S13, the controller 250 determines whether or not the measurement data of the third repulsive force measurement device 242 falls within a specified range R3. The specified range R3 corresponds to, for example, an allowable range with reference to the intended hardness index of the 3DF 203 in a position corresponding to the third repulsive force measurement device 242. As a result of the determination in step S13, when the measurement data falls within the specified range R3 (yes in step S13), the present flow is completed. However, when the measurement data falls outside the specified range R3 (no in step S13), the flow proceeds to the processing of step S14.

As the processing of step S14, the controller 250 determines whether or not the measurement data of the third repulsive force measurement device 242 is higher than the specified range R3. As a result, when the measurement data is lower than the specified range R3 (that is, when the measurement data falls outside the specified range R3 so as to be lower than the specified range R3), the flow proceeds to the processing of step S15. In step S15, the output of the third die heater 220 is controlled (such as the change of the setting of the target temperature) such that the detection temperature of the third temperature sensor 223 is increased by a predetermined temperature (for example, 1° C.), and thereafter the present flow is completed. Here, a necessary adjustment may be performed on the outputs of the other die heaters.

On the other hand, when the measurement data of the third repulsive force measurement device 242 is higher than the specified range R3 (that is, when the measurement data falls outside the specified range R3 so as to be higher than the specified range R3), the flow proceeds to the processing of step S16. In step S16, the output of the third die heater 220 is controlled (such as the change of the setting of the target temperature) such that the detection temperature of the third temperature sensor 223 is decreased by a predetermined temperature (for example, 1° C.), and thereafter the present flow is completed. Here, a necessary adjustment may be performed on the outputs of the other die heaters.

In the processing of steps S14 to S16, when the measurement data of the third repulsive force measurement device 242 falls outside the specified range R3 so as to be lower than the specified range R3 (that is, when the 3DF 203 is excessively softened), the control is performed such that the output of the third die heater 220 is increased whereas when the measurement data of the third repulsive force measurement device 242 falls outside the specified range R3 so as to be higher than the specified range R3 (that is, when the 3DF 203 is excessively hardened), the control is performed such that the output of the third die heater 220 is lowered.

When the measurement data of the repulsive force measurement device is lower than the specified range such that the output (the amount of heat generation) of the die heater is increased, the temperature of the thermoplastic resin near the die heater within the flat guide flow portion 212a1 is increased. In this way, since the discharge rate of the molten filament discharged from the nozzles (part of a plurality of nozzles provided in the cap 217) near the die heater is increased, the portion of the 3DF 203 corresponding to the molten filament is increased in density so as to be hardened (the hardness index is increased), and thus the measurement data of the repulsive force measurement device easily falls within the specified range.

For example, when the measurement data of the first repulsive force measurement device 240 is lower than the specified range R1, the output of the first die heater 218 is increased, and thus the portion of the 3DF 203 corresponding to the molten filament discharged from the nozzles near it is hardened, with the result that the measurement data of the first repulsive force measurement device 240 easily falls within the specified range R1.

By contrast, when the measurement data of the repulsive force measurement device is higher than the specified range such that the output (the amount of heat generation) of the die heater is lowered, the temperature of the thermoplastic resin near the die heater within the flat guide flow portion 212a1 is lowered. In this way, since the discharge rate of the molten filament discharged from the nozzles (part of a plurality of nozzles provided in the cap 217) near the die heater is lowered, the portion of the 3DF 203 corresponding to the molten filament is decreased in density so as to be softened (the hardness index is lowered), and thus the measurement data of the repulsive force measurement device easily falls within the specified range.

For example, when the measurement data of the first repulsive force measurement device 240 is higher than the specified range R1, the output of the first die heater 218 is lowered, and thus the portion of the 3DF 203 corresponding to the molten filament discharged from the nozzles near it is softened, with the result that the measurement data of the first repulsive force measurement device 240 easily falls within the specified range R1.

Preferably, the flow of steps S1 to S16 described above is repeatedly performed, for example, at a predetermined time interval. In this way, continuous feedback control is realized such that the pieces of measurement data of the repulsive force measurement devices 240 to 242 respectively fall within the corresponding specified ranges R1 to R3. In the present embodiment, as an example, each time the pressurization surface 262a presses the 3DF 203 (see FIG. 16B), the flow described above is preferably performed.

Although in the present embodiment, based on the measurement data of the repulsive force measurement devices 240 to 242, instead, the outputs of the die heaters are controlled, based on the detection data of the temperature sensors 221 to 223, the outputs of the die heaters may be controlled. When this type of control is adopted, the installation of the repulsive force measurement devices can also be omitted.

Although in the present embodiment, in the processing of step S7 and the like, the output of the die heater is controlled such that the detection temperature of the temperature sensor is changed only by the predetermined temperature, instead, for example, the control may be performed such that the output (such as power consumption) of the die heater is changed only by a predetermined value. As an example, when the measurement data of the first repulsive force measurement device 240 is less than the specified range, the power consumption of the first die heater 218 may be controlled so as to be increased only by the predetermined value.

As described above, the 3DF manufacturing device 201 of the present embodiment includes: the cap 217 (cap portion) in which a plurality of nozzles are formed and in which as compared with the length of the cap portion in the first direction, the length thereof in the second direction is short; a plurality of die heaters 218 to 220; the die temperature control portion 224 and the controller 250 (temperature control portion) which control the outputs of the die heaters 218 to 220; and the guide flow path 212a which guides the supplied molten thermoplastic resin to the cap 217. In the 3DF manufacturing device 201, the molten thermoplastic resin guided to the cap 217 is passed through the nozzles, the molten filaments 202 are discharged and the molten filaments 202 are cooled and solidified so as to form the 3DF 203. Furthermore, the guide flow path 212a includes the flat guide flow portion 212a1 in which as compared with the length of the flat guide flow portion in the first direction, the length thereof in the second direction is narrowed, and the die heaters 218 to 220 are arranged in different positions along the flat guide flow portion 212a1 in the first direction.

Hence, with the 3DF manufacturing device 201, for example, even when the 3DF 203 that is used such as for a mattress whose width is wide is manufactured, it is easy to more appropriately control the hardness thereof. Even when the nozzle group is formed such that the discharge rate of the molten filament 202 differs between the center portion and the end portions in the direction of the width of the nozzles, the temperature of the molten filaments 202 is uniformly controlled in the longitudinal direction of the nozzle group, and thus it is possible to obtain the 3DF 203 whose hardness is stable.

In addition to the case where the filament temperature which affects the filament density is made uniform in the direction of the width, even in a case where the filament temperature is intentionally made to differ in the direction of the width, the temperatures of the die heaters 218 to 220 are controlled in the individual positions in the direction of the width, and thus the intended filament temperature is easily realized. Hence, it is possible to obtain the 3DF 203 whose hardness is stable, and it is also possible to easily obtain various types of 3DFs 203 whose hardness distribution in the direction of the width is varied. In the present embodiment, the ratio (the degree of flatness) between the length of the flat guide flow portion 212a1 in the first direction and the length thereof in the second direction is sufficiently higher than the ratio in the cap 217.

Although in the present embodiment, the number of die heaters is set to three, the number of die heaters may be set to two or four or more. Normally, as the number of die heaters is increased, the hardness of the 3DF 203 can be more finely controlled in the direction of the width. A plurality of heaters in the present invention may be formed integrally in a formal manner. For example, even in a case where a plurality of heaters which can be controlled individually and independently are covered with a thin enclosure or the like and are formed as one heater in a formal manner, a plurality of heaters are regarded as being practically included, and thus the case can be included in the technical scope of the present invention.

Furthermore, in the 3DF manufacturing device 201, a plurality of temperature sensors 221 to 223 are arranged so as to be aligned along the flat guide flow portion 212a1 in the first direction. Hence, the results of the detection of the temperature sensors 221 to 223 are utilized, and thus it is possible to control the outputs of the die heaters 218 to 220. In this way, for example, as with the processing of step S7 described previously, it is possible to easily perform the processing in which the control temperatures of the die heaters are increased by the predetermined temperature (for example, 1° C.).

The 3DF manufacturing device 201 includes a plurality of repulsive force measurement devices 240 to 242 (hardness index measurement portions) which are arranged in different positions in the first direction, and the repulsive force measurement devices 240 to 242 individually measure the repulsive forces (hardness indexes) of the 3DF 203 in the corresponding positions. Furthermore, the temperature control portion controls, based on the results of the measurements of the repulsive force measurement devices 240 to 242, the outputs of the die heaters 218 to 220.

Hence, the hardness indexes of the individual portions of the 3DF 203 in the direction of the width (the first direction) are measured, and thus it is possible to control, based on the information thereof, the outputs (temperatures) of the die heaters 218 to 220 in the corresponding positions. Thus, it is possible to more reliably reduce a variation in the hardness of the 3DF 203 in the direction of the width.

Each of the repulsive force measurement devices 240 to 242 includes: the rotation pressurization member 261 that has the protrusion portion 262 whose pressurization surface 262a is displaced when the rotation pressurization member 261 is rotated; the rotation member 271 (the rotation opposite member) which is rotatably provided opposite the rotation pressurization member 261 through the 3DF 203; and the pressure measurement portion 270 which measures the repulsive force when the 3DF 203 is compressed between the rotation pressurization member 261 and the rotation member 271, and the measurement data of the repulsive force is output as the measurement data of the hardness index. Hence, it is possible to continuously measure the hardness index with the repulsive force measurement device without stopping the 3DF 203 which is being transported, with the result that it is possible to achieve the control in which rapid feedback is performed.

<Others>

The 3DF manufacturing device according to each of the embodiments includes: the molten filament supply device which supplies a plurality of molten filaments; the three-dimensional structure formation device which receives and then cools and solidifies the molten filaments so as to form the 3DF; and the controller which controls the molten filament supply device and the three-dimensional structure formation device. In the 3DF manufacturing device, the hardness index measurement device is provided which measures the hardness index of the 3DF that is brought into a cooled state by the three-dimensional structure formation device. Furthermore, the controller uses the information of the measurement of the hardness index measurement device that is fed back and thereby performs feedback control on at least one of the molten filament supply device and the three-dimensional structure formation device so as to reduce a variation in the hardness of the formed 3DF.

The controller performs, based on the results of the measurement of the hardness index of the 3DF, the feedback control on a predetermined operation which can affect the hardness of the 3DF so as to reduce a variation in the hardness of the 3DF. In this way, it is possible to reduce a variation in the hardness of the 3DF. The cooled state in each of the embodiments is a state where the molten filaments are cooled and solidified so as not to be irreversibly deformed. The feedback control is performed by use of the information of the measurement of the hardness index of the 3DF in the cooled state, and thus as compared with a case where the feedback control is performed by use of the information of the measurement of the hardness index of the 3DF after the cooled state (in a state where the 3DF has already exited from the cooling water so as not to be cooled), the feedback control with higher accuracy can be performed. Although in each of the embodiments, the 3DF is brought into the cooled state by use of the cooling water in the three-dimensional structure formation device, the 3DF may be brought into the cooled state by another form.

In each of the embodiments, the time which elapses after the molten filaments are passed through the nozzle portion until the molten filaments reach the hardness index measurement device (at the time when the molten filaments reach the hardness index measurement device, the molten filaments have already been formed into the 3DF) is determined by the transport speed of the 3DF with a conveyor or the like, and thus it is possible to grasp the time in the 3DF manufacturing device. When the transport speed of the 3DF or the like is made constant, since the time is fixed, it is particularly easy to grasp the time. The time is grasped, and thus it is found when the individual portions of the 3DF to be measured by the hardness index measurement devices are passed through the nozzle portion (that is, when the individual portions are affected by the temperature of the nozzle portion). In this way, the 3DF manufacturing device can also reduce a variation in the hardness of the 3DF based on the information of the measurement of the hardness index measurement device with appropriate consideration given to a variation in the temperature of the nozzle portion affecting the hardness of the 3DF.

For example, when it is assumed that the hardness index of the 3DF after being formed into a product by a manual operation or the like is measured and that based on the information of the measurement, the feedback control is performed, in the 3DF manufacturing device, it is difficult to grasp when the individual portions of the 3DF to be measured by the hardness index measurement devices are passed through the nozzle portion. As compared with such a case, in a case where appropriate consideration can be given to a variation in the temperature of the nozzle portion as described above, it is possible to more accurately reduce a variation in the hardness of the 3DF.

In the configuration of the present invention, in addition to the embodiments described above, various modifications can be added without departing from the spirit of the invention. It should be understood that the technical scope of the present invention is indicated not by the description of the embodiments discussed above but by the scope of claims, and meanings equivalent to the scope of claims and all modifications belonging to the scope are included therein.

The invention claimed is:

1. A device for manufacturing a filament three-dimensional bonded member, the device comprising:
   a molten filament supply device which supplies a plurality of molten filaments;
   a three-dimensional structure formation device which receives and then cools and solidifies the molten filaments so as to form a filament three-dimensional bonded member; and
   a controller which controls the molten filament supply device and the three-dimensional structure formation device,
   wherein a plurality of hardness index measurement devices is provided in the three-dimensional structure formation device and arranged in different positions along a width direction of the filament three-dimensional bonded member, each of the plurality of hardness index measurement devices is configured to measure a hardness index of the filament three-dimensional bonded member in the corresponding position that is brought into a cooled state by the three-dimensional structure formation device, and the controller is configured to use information of the measurement of the plurality of hardness index measurement devices that is fed back during production of the filament three-dimensional bonded member and thereby performs feedback control for controlling at least one of the molten filament supply device and the three-dimensional structure formation device so as to reduce a variation in hardness of the formed filament three-dimensional bonded member.

2. The device for manufacturing the filament three-dimensional bonded member according to claim 1,
wherein the cooled state is a state where the molten filaments are cooled and solidified so as not to be irreversibly deformed.

3. The device for manufacturing the filament three-dimensional bonded member according to claim 1,
wherein within the three-dimensional structure formation device, a transport member is provided which transports the formed filament three-dimensional bonded member, and
the feedback control is performed for controlling a transport speed of the transport member.

4. The device for manufacturing the filament three-dimensional bonded member according to claim 1,
wherein the molten filament supply device heats and melts a resin and pressurizes the molten resin so as to supply the molten filaments, and
the feedback control is performed for controlling at least one of a degree of the heating and a degree of the pressurization.

5. The device for manufacturing the filament three-dimensional bonded member according to claim 1,
wherein each of the plurality of hardness index measurement devices includes:
a pair of abutting members opposite to each other, wherein the pair of abutting members applies a predetermined pressure between a front and back of the filament three-dimensional bonded member;
a displacement member fixed to the pair of abutting members, and presses the pair of abutting members in a first direction so as to displace the pair of abutting members;
a displacement sensor supporting the displacement member and movable in the first direction, wherein the displacement sensor which detects a degree of recessing of the filament three-dimensional bonded member caused by the application of the pressure and which outputs the degree; and
a pressure supply portion joined with the displacement sensor for applying the predetermined pressure to the displacement member and the pair of abutting members.

6. The device for manufacturing the filament three-dimensional bonded member according to claim 1,
wherein each of the plurality of hardness index measurement devices includes:
an abutting member which is rotated in a direction of movement of the filament three-dimensional bonded member such that a pressurization surface abuts on the filament three-dimensional bonded member; and
a pressure sensor which detects a repulsive pressure received by the abutting member from the filament three-dimensional bonded member and which outputs the repulsive pressure.

7. A method for manufacturing a filament three-dimensional bonded member, the method comprises using a device for manufacturing a filament three-dimensional bonded member that includes: a molten filament supply device which supplies a plurality of molten filaments; a three-dimensional structure formation device which receives and then fuses the molten filaments so as to form a filament three-dimensional bonded member; and a plurality of hardness index measurement devices provided in the three-dimensional structure formation device and arranged in different positions along a width direction of the filament three-dimensional bonded member,
wherein a hardness index of the formed filament three-dimensional bonded member is measured using each of the plurality of hardness index measurement devices, and
at least one of the molten filament supply device and the three-dimensional structure formation device is controlled according to a result of the measurement from the plurality of hardness index measurement devices that is fed back during production of the filament three-dimensional bonded member such that a variation in hardness of the filament three-dimensional bonded member is reduced.

8. The method for manufacturing the filament three-dimensional bonded member according to claim 7,
wherein within the three-dimensional structure formation device, a transport member is provided which transports the formed filament three-dimensional bonded member, and
the control is performed for controlling a transport speed of the transport member.

9. The device for manufacturing the filament three-dimensional bonded member according to claim 1,
wherein the molten filament supply device includes:
a cap portion in which a plurality of nozzles are formed and in which as compared with a length of the cap portion in a first direction, a length of the cap portion in a second direction perpendicular to the first direction is short;
a plurality of heaters; and
a guide flow path which guides a molten thermoplastic resin to the cap portion,
the molten filament supply device is formed so as to discharge, through the nozzles, the molten thermoplastic resin guided to the cap portion and thereby supply the molten filaments,
the guide flow path includes a flat guide flow portion in which as compared with a length of the flat guide flow portion in the first direction, a length of the flat guide flow portion in the second direction is narrowed,
the heaters are arranged in different positions along the flat guide flow portion in the first direction and
the feedback control is performed for controlling outputs of the heaters.

10. The device for manufacturing the filament three-dimensional bonded member according to claim 9,
wherein a ratio between the length of the flat guide flow portion in the first direction and the length of the flat guide flow portion in the second direction is higher than the ratio in the cap portion.

11. The device for manufacturing the filament three-dimensional bonded member according to claim 9,
wherein a plurality of temperature sensors are arranged so as to be aligned along the flat guide flow portion in the first direction.

12. The device for manufacturing the filament three-dimensional bonded member according to claim 9,
wherein the controller controls, as the feedback control, the outputs of the heaters based on results of the measurements of the plurality of hardness index measurement devices.

13. A method for manufacturing a filament three-dimensional bonded member, the method comprising:
a molten thermoplastic resin supply step of supplying, through a guide flow path including a flat guide flow portion in which as compared with a length of the flat guide flow portion in a first direction, a length of the flat guide flow portion in a second direction perpendicular to the first direction is narrowed, a molten thermoplastic resin to a cap portion in which as compared with a length of the cap portion in the first direction, a length of the cap portion in the second direction is short;
a molten filament supply step of passing the molten thermoplastic resin through a plurality of nozzles formed in the cap portion so as to discharge a plurality of molten filaments;
a filament three-dimensional bonded member generation step of fusing and then cooling and solidifying the molten filaments so as to form a filament three-dimensional bonded member;
a hardness index measurement step of measuring hardness indexes in a plurality of positions in a direction of a width of the filament three-dimensional bonded member corresponding to the first direction; and
a temperature control step of controlling, by use of information of results of the measurements that is fed back, temperatures of heaters which are arranged so as to be aligned along the flat guide flow portion in the first direction such that a variation in hardness of the formed filament three-dimensional bonded member is reduced.

14. The device for manufacturing the filament three-dimensional bonded member according to claim 2,
wherein within the three-dimensional structure formation device, a transport member is provided which transports the formed filament three-dimensional bonded member, and
the feedback control is performed for controlling a transport speed of the transport member.

15. The device for manufacturing the filament three-dimensional bonded member according to claim 2,
wherein the molten filament supply device heats and melts a resin and pressurizes the molten resin so as to supply the molten filaments, and
the feedback control is performed for controlling at least one of a degree of the heating and a degree of the pressurization.

16. The device for manufacturing the filament three-dimensional bonded member according to claim 2,
wherein each of the plurality of hardness index measurement device includes:
a pair of abutting members opposite to each other, wherein the pair of abutting members applies a predetermined pressure between a front and back of the filament three-dimensional bonded member;
a displacement member fixed to the pair of abutting members, and presses the pair of abutting members in a first direction so as to displace the pair of abutting members;
a displacement sensor supporting the displacement member and movable in the first direction, wherein the displacement sensor which detects a degree of recessing of the filament three-dimensional bonded member caused by the application of the pressure and which outputs the degree; and
a pressure supply portion joined with the displacement sensor for applying the predetermined pressure to the displacement member and the pair of abutting members.

17. The device for manufacturing the filament three-dimensional bonded member according to claim 2,
wherein each of the plurality of hardness index measurement device includes:
an abutting member which is rotated in a direction of movement of the filament three-dimensional bonded member such that a pressurization surface abuts on the filament three-dimensional bonded member; and
a pressure sensor which detects a repulsive pressure received by the abutting member from the filament three-dimensional bonded member and which outputs the repulsive pressure.

18. The device for manufacturing the filament three-dimensional bonded member according to claim 2,
wherein the molten filament supply device includes:
a cap portion in which a plurality of nozzles are formed and in which as compared with a length of the cap portion in a first direction, a length of the cap portion in a second direction perpendicular to the first direction is short;
a plurality of heaters; and
a guide flow path which guides a molten thermoplastic resin to the cap portion,
the molten filament supply device is formed so as to discharge, through the nozzles, the molten thermoplastic resin guided to the cap portion and thereby supply the molten filaments,
the guide flow path includes a flat guide flow portion in which as compared with a length of the flat guide flow portion in the first direction, a length of the flat guide flow portion in the second direction is narrowed,
the heaters are arranged in different positions along the flat guide flow portion in the first direction and
the feedback control is performed for controlling outputs of the heaters.

19. The device for manufacturing the filament three-dimensional bonded member according to claim 18,
wherein a ratio between the length of the flat guide flow portion in the first direction and the length of the flat guide flow portion in the second direction is higher than the ratio in the cap portion.

20. The device for manufacturing the filament three-dimensional bonded member according to claim 18,
wherein a plurality of temperature sensors are arranged so as to be aligned along the flat guide flow portion in the first direction.

* * * * *